United States Patent
Joshi et al.

(10) Patent No.: US 12,556,393 B2
(45) Date of Patent: Feb. 17, 2026

(54) SYSTEMS AND METHODS FOR REAL-TIME TRACEABILITY USING AN OBFUSCATION ARCHITECTURE

(71) Applicant: Wells Fargo Bank, N.A., San Francisco, CA (US)

(72) Inventors: Arushi Sood Joshi, San Franciso, CA (US); George Bonano, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 310 days.

(21) Appl. No.: 18/206,756

(22) Filed: Jun. 7, 2023

(65) Prior Publication Data
US 2024/0414002 A1     Dec. 12, 2024

(51) Int. Cl.
*H04L 9/32*     (2006.01)

(52) U.S. Cl.
CPC .................................. *H04L 9/3218* (2013.01)

(58) Field of Classification Search
CPC ...................................................... H04L 9/3218
See application file for complete search history.

(56) References Cited

U.S. PATENT DOCUMENTS

| | | | |
|---|---|---|---|
| 2018/0082296 A1* | 3/2018 | Brashers | H04L 9/3236 |
| 2019/0228386 A1* | 7/2019 | Onnainty | H04L 9/3239 |
| 2020/0067907 A1* | 2/2020 | Avetisov | H04L 67/133 |
| 2020/0221011 A1* | 7/2020 | Komori | G01J 3/2803 |
| 2021/0226795 A1* | 7/2021 | Covaci | H04L 63/04 |
| 2022/0405260 A1* | 12/2022 | Snow | G06F 16/27 |
| 2024/0062200 A1* | 2/2024 | Wright | G06Q 20/389 |
| 2024/0313979 A1* | 9/2024 | Garcia Morchon | G16B 50/30 |

* cited by examiner

*Primary Examiner* — Rupal Dharia
*Assistant Examiner* — Devin E Almeida
(74) *Attorney, Agent, or Firm* — Foley & Lardner LLP

(57) ABSTRACT

Systems, methods, and computer-readable storage media to trace obfuscated data of an entity. One system includes a data processing system including memory and one or more processors configured to generate a data structure including a plurality of cryptographic outputs, wherein each of the plurality of cryptographic outputs obfuscates data of at least one identifier of the entity. The processors are further configured to broadcast the data structure to a distributed ledger and receive a proof request associated with a customer's cryptographic output. The processors are further configured to generate a cryptographic proof dataset for the customer's cryptographic output and provide the cryptographic proof dataset.

18 Claims, 8 Drawing Sheets

SYSTEMS AND METHODS FOR REAL-TIME TRACEABILITY USING AN OBFUSCATION ARCHITECTURE

BACKGROUND

In a computer networked environment, users and entities like individuals or companies may desire to verify and trace data of an entity.

SUMMARY

Some arrangements relate to a system, including at least one memory and one or more processors configured to generate a data structure including a plurality of cryptographic outputs, wherein each of the plurality of cryptographic outputs obfuscates data of at least one identifier of the entity, broadcast the data structure to a distributed ledger, receive, from a customer computing system, a proof request associated with a customer's cryptographic output of the plurality of cryptographic outputs of the data structure, generate a cryptographic proof dataset for the customer's cryptographic output, wherein the cryptographic proof dataset includes at least one of the plurality of cryptographic outputs stored in the data structure, and provide, to the customer computing system, the cryptographic proof dataset.

In some arrangements, generating the data structure further includes obfuscating, using a cryptographic function, first data and second data to generate a first cryptographic output, obfuscating, using the cryptographic function, the first cryptographic output and third data to generate a second cryptographic output, and updating the data structure to include the second cryptographic output, wherein the second cryptographic output is one of the plurality of cryptographic outputs.

In some arrangements, prior to obfuscating the first data and the second data, the first data is aggregated with the second data using a first mathematical function, and wherein prior to obfuscating the first cryptographic output and the third data, the first cryptographic output is aggregated with the third data using a second mathematical function.

In some arrangements, the first data and the second data includes customer account identification information and the third data is a customer account balance associated with the customer account identification information.

In some arrangements, the cryptographic function is a hash function configured to tokenize the data for each of the plurality of cryptographic outputs, and wherein the hash function generates quantum resistant signatures stored as the plurality of cryptographic outputs in the data structure.

In some arrangements, the data structure includes a Merkle tree including a root node and a plurality of branches and a plurality of leaves, wherein each leaf of the plurality of leaves includes a leaf cryptographic output of the plurality of cryptographic outputs, and wherein the root node includes a root cryptographic output corresponding to at least one of a proof of solvency, a proof of assets, a proof of reserves, or a proof of liabilities of the entity.

In some arrangements, the data represents an aggregate obfuscation of entity's on-chain solvencies, on-chain assets, on-chain reserves, or on-chain liabilities, and wherein the at least one identifier is associated with a plurality of accounts of a plurality of customers of the entity.

In some arrangements, the Merkle tree is stored in a block on the distributed ledger, and wherein the leaf cryptographic output represents obfuscated customer account information of a customer of the entity, and wherein each branch of the Merkle tree includes a branch cryptographic output corresponding to an aggregation of at least two leaves of the plurality of leaves using a cryptographic function.

In some arrangements, the customer's cryptographic output is unique to a customer, and wherein the data is a digital position of the entity corresponding to a tokenization of a book position of the entity associated with the customer.

In some arrangements, the generation of the data structure and the generation of the cryptographic proof dataset is data agnostic, and wherein the entity is associated with an entity posture, and wherein the entity posture includes a plurality of sub-postures, and wherein at least one of the plurality of sub-postures represents an economic posture unique to a customer.

In some arrangements, the entity posture is publicly available and includes unobfuscated data corresponding to at least one of a solvency parameter, an asset parameter, a reserves parameter, or a liabilities parameter, and wherein each of the plurality of sub-postures is obfuscated data of a plurality of customers of the entity.

In some arrangements, the at least one memory and the one or more processors is further configured to in response to an indication of an update to the data, generate an updated data structure including the plurality of cryptographic outputs, and broadcast the updated data structure to the distributed ledger, wherein the update to the data is associated with an exchange of at least a portion of the data, wherein the exchange is one of a buy, sell, or transfer.

Some arrangements relate to a method, including generating, by one or more processing circuits, a data structure including a plurality of cryptographic outputs, wherein each of the plurality of cryptographic outputs obfuscates data of at least one identifier of the entity, broadcasting, by the one or more processing circuits, the data structure to a distributed ledger, receiving, by the one or more processing circuits from a customer computing system, a proof request associated with a customer's cryptographic output of the plurality of cryptographic outputs of the data structure, generating, by the one or more processing circuits, a cryptographic proof dataset for the customer's cryptographic output, wherein the cryptographic proof dataset includes at least one of the plurality of cryptographic outputs stored in the data structure, and providing, by the one or more processing circuits, to the customer computing system, the cryptographic proof dataset.

In some arrangements, generating the data structure further includes obfuscating, by the one or more processing circuits using a cryptographic function, first data and second data to generate a first cryptographic output, obfuscating, by the one or more processing circuits using the cryptographic function, the first cryptographic output and third data to generate a second cryptographic output, and updating, by the one or more processing circuits, the data structure to include the second cryptographic output, wherein the second cryptographic output is one of the plurality of cryptographic outputs.

In some arrangements, prior to obfuscating the first data and the second data, the first data is aggregated with the second data using a first mathematical function, and wherein prior to obfuscating the first cryptographic output and the third data, the first cryptographic output is aggregated with the third data using a second mathematical function, and wherein the first data and the second data includes customer account identification information and the third data is a customer account balance associated with the customer account identification information.

In some arrangements, the data structure includes a Merkle tree including a root node and a plurality of branches and a plurality of leaves, wherein each leaf of the plurality of leaves includes a leaf cryptographic output of the plurality of cryptographic outputs, and wherein the root node includes a root cryptographic output corresponding to at least one of a proof of solvency, a proof of assets, a proof of reserves, or a proof of liabilities of the entity.

Some arrangements relate to a system, including memory and one or more processors configured to generate a data structure including a plurality of cryptographic outputs, wherein each of the plurality of cryptographic outputs obfuscates data of at least one identifier of the entity, broadcast the data structure to a distributed ledger, receive, from a third-party computing system, a proof request, generate a cryptographic proof dataset, wherein the cryptographic proof dataset includes at least one of the plurality of cryptographic outputs stored in the data structure, and provide, to the third-party computing system, the cryptographic proof dataset.

In some arrangements, generating the data structure further includes obfuscating, using a cryptographic function, first data and second data to generate a first cryptographic output, obfuscating, using the cryptographic function, the first cryptographic output and third data to generate a second cryptographic output, and updating the data structure to include the second cryptographic output, wherein the second cryptographic output is one of the plurality of cryptographic outputs.

In some arrangements, prior to obfuscating the first data and the second data, the first data is aggregated with the second data using a first mathematical function, and wherein prior to obfuscating the first cryptographic output and the third data, the first cryptographic output is aggregated with the third data using a second mathematical function, and wherein the first data and the second data includes customer account identification information and the third data is a customer account balance associated with the customer account identification information.

In some arrangements, the data structure is a Merkle tree including a root node and a plurality of branches and a plurality of leaves, wherein each leaf of the plurality of leaves include a leaf cryptographic output of the plurality of cryptographic outputs, and wherein the root node includes a root cryptographic output corresponding to at least one of a proof of solvency, a proof of assets, a proof of reserves, or a proof of liabilities of the entity.

Figure 1:
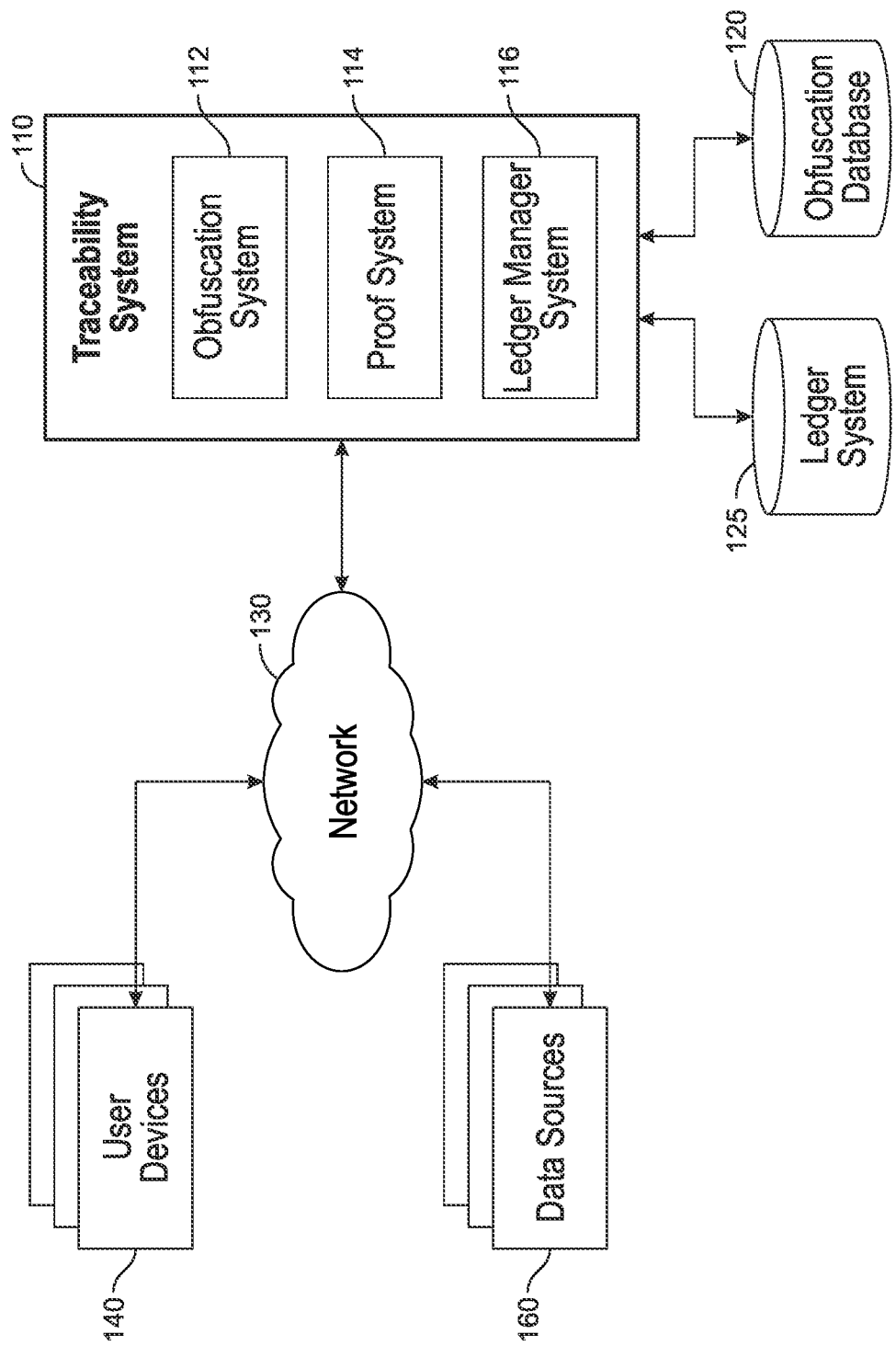
FIG. 1 is a block diagram depicting an example of a traceability system in a computing environment, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems, apparatuses, methods, and non-transitory computer-readable media for real-time data traceability and obfuscation are presented. In some arrangements, a data structure can be generated to include a cryptographic outputs. These outputs can be created by obfuscating various sets of data using one or more cryptographic functions, thus generating multiple cryptographic outputs. This structure, a digital twin (or parallel twin, or a digital representation) of the entity's data, can then be broadcast to a distributed ledger, corresponding to the tokenization of digital representations of data held by the entity. Through this process, the systems and methods enable a secure, real-time update of the data of the entity on the distributed ledger. Furthermore, a cryptographic proof dataset of a customer's tokenized data and liability held on the distributed ledger can be generated, providing verifiable assurance of a customer's account and data corresponding to the bank's overall posture (e.g., financial or economic claim).

In the modern financial landscape, events such as those that transpire during banking crises underscore the inherent necessity for a mechanism that could bolster stakeholders' confidence in an entity's solvency. At the core of deposit runs, there is often a profound lack of faith in an entity's ability to repay advances. Typically, public companies' financial statements are relied upon for this assurance. However, given that these statements are not issued daily and a substantial time lag often exists between their release and the potential investor or customer's reaction, current systems fail to provide real-time assurance. The system and methods described herein addresses this issue, bolstering confidence that an entity possesses the requisite data to fulfill its obligations.

The systems and methods described herein integrates blockchain or distributed ledger technology to provide real-time data traceability (e.g., such as information associated with an identifier or account of an entity). In the current landscape, the Federal Reserve is aware of the reserves held by each bank but lacks visibility into their complete books and records. As disclosed herein, the systems and methods provides real-time traceability that maintains obfuscation, allowing federal regulators to assess a bank's solvency at any given moment. This improves computer functionality by enhancing data processing efficiency and veracity, illustrating a technical improvement in the field of real-time data monitoring.

In some arrangements, the systems and methods are configured to ascertain whether information or data related to a distinct account or identifier is embodied in a unique cryptographic output tied to a database, ledger, or system of a provider (e.g., entity or institution). This is accomplished through implementing cryptographic functions, generating an output for each account or identifier that then contributes to the formation of a data structure. This data structure can be systematically updated on a distributed ledger, ensuring a real-time reflection of the entity's data, obfuscated to uphold individual account privacy. Thus, the systems and methods are configured to determine if information or data linked to a specific account or identifier is encapsulated within a distinct cryptographic output. This output corresponds to the collective financial position of the provider as represented in a database, ledger, or system, embodying the asset-liability spectrum of the provider. Therefore, the system and methods signifies provide an improvement to existing systems and methods by providing real-time traceability and verification of an entity's data, while protecting data of the underlying accounts or identifier of the provider.

In terms of privacy, the systems and methods ensure customer protected information remains concealed. In some arrangements, the only shared information consists of non-protected data like quantum-resistant hashes, thus achieving verification and traceability of data without violating privacy standards and without exposing sensitive customer data. Accordingly, the systems and methods can provide an ultimate proof of an entity's data without revealing the detailed ledger supporting it (i.e., obfuscating financial records). This is a unique transformation of sensitive financial data, converting it into a secured, obfuscated state through cryptographic processes.

In terms of data security, the system and methods improve data security by obfuscating sensitive financial data while simultaneously providing incontrovertible proofs of an entity's financial data. This approach adds an extra layer of security to customer's financial data. By transforming explicit data, such as account balances and identifying information (e.g., account numbers, identifiers, and so on), into encrypted cryptographic outputs, the system disguises (or obfuscates) the underlying data while retaining the ability to verify its validity. As such, even in the unlikely event of a data breach, the exposed information would be of minimal utility to potential threat actors due to its obfuscated nature. In some arrangements, the use of quantum-resistant cryptographic functions in the system further bolsters data security. This improved level of data protection and the resulting enhanced security climate not only serve to safeguard individual customers' sensitive financial information but also fortify the entire entity against potential cyber threats, thus contributing to the improvement of the broader field of cybersecurity in the financial sector.

Additionally, the proof provided encompasses not only deposits but also the entire balance sheet of an entity, including proof of solvency, assets, and liabilities. The use of cryptographic proofs allows for the tokenization of the bank's liabilities for customers. By verifying tokenized deposits, the bank can provide indisputable evidence of its ability to fulfill its obligations. For example, a bank can demonstrate that it owns the private keys corresponding to $5 billion in tokenized deposits, verifying that it indeed has the means to meet its obligations to its customers.

Accordingly, the present disclosure is directed to systems and methods for improving real-time data traceability, data security, and stakeholder confidence in entities or other data holders (e.g., financial entities, private equity entities, publicly traded companies, privately held companies). It achieves this by implement cryptographic means and distributed ledger technology, such as blockchain, to traditionally opaque financial systems. This approach allows for the obfuscation of sensitive customer information while maintaining the ability to provide indisputable proof of an entity's financial data, including solvency, assets, liabilities, and reserves. Furthermore, the system's use of quantum-resistant cryptographic functions ensures a high level of data security, preparing the financial landscape for the forthcoming era of quantum computing. Thus, the systems and methods described herein provide a more transparent, secure, and efficient systems.

As used herein, a "cryptographic output" refers to an output of a cryptographic function that denotes a result or product that transformed data input into an output that is unintelligible without a correct decryption key or process. Examples of cryptographic outputs include but are not limited to hash values produced by hash functions, digital signatures that verify the authenticity of data, encrypted messages that mask the original content, or secure ciphers that scramble and protect data. In the systems and methods described herein, cryptographic outputs obfuscate sensitive data, ensuring privacy, and maintaining data integrity. For example, the cryptographic outputs can represent the encoded, secure form of the entity's and customers' data (e.g., postures), enabling the system to safely store, protect, and handle financial data without compromising confidentiality.

As used herein, a "posture" refers to data of an account and/or identifier with an economic position or financial position of the entity, such as solvency, assets, liabilities, or other related indicators. Posture is indicated by determining whether information or data associated with a certain account or identifier is represented in a single cryptographic output corresponding to a database, ledger, and/or system of a provider institution. Put differently, a posture is determined by verifying if data linked to a specific account or identifier is encapsulated in a unique cryptographic output corresponding to a database, ledger, or system of a provider entity or institution. In particular, a posture can be construed as a snapshot or representation of the financial health of an entity or account at a given point in time. It's a multidimensional concept that encapsulates various economic indicators such as the entity's solvency (its ability to meet long-term obligations), assets (what it owns), liabilities (what it owes), and other related financial markers. The data (e.g., assets, liabilities, account balances, math-based currency, etc.) associated with the posture forms the basis for both entity-wide assessments and individual customer-specific analyses, thus promoting a multifaceted understanding of the entity's financial landscape.

As used herein, a "data structure" refers to a framework employed to arrange and store data. Depending on the nature of data and the requirements of operations performed on it, various data structures like a Merkle tree, linked list, hash table, graph, or an array could be employed. For instance, the system described herein employs a Merkle tree to arrange the cryptographic outputs. Each node in this tree holds a cryptographic output, and the tree's structure allows for quick and secure verification of data. The root of the tree provides an aggregated view of the economic or financial posture, while the individual leaves represent obfuscated customer data. This organization of data into a specific structure improves data access and manipulation and also provides real-time traceability, data or posture verification, and secure data obfuscation.

It should be understood that "real-time" as used herein does not necessarily mean instantaneous, but rather refers to a process or system in which information is updated at a frequency that is suitable for its intended purpose, thereby enabling timely responses and decisions based on the most recent data available.

Referring now to FIG. 1, a block diagram depicting an example of a traceability system 110 in a computing environment 100 is shown, according to some arrangements. The computing environment 100 is shown to include a traceability system 110, user devices 140, and data sources 160. The plurality of devices and/or systems 110, 140, and/or 160 may initiate, collect, and/or route (e.g., provide) data over network 130. A data acquisition engine of the traceability system 110 may provide a single application programming interface (API) or multiple APIs to access various data generated, stored, or routed by devices and systems 110, 140, and/or 160.

In general, the one or more processing circuits can include a microprocessor, an application specific integrated circuit (ASIC), a field-programmable gate array (FPGA), and so on, or combinations thereof. A memory can include, but is not limited to, electronic, optical, magnetic, or any other storage or transmission device capable of providing processor with program instructions. Instructions can include code from any suitable computer programming language. The memory may also store parameter data to affect presentation of one or more resources, exchanges of one or more digital currencies, attributes of one or more digital currencies, and so on, on the computing devices and/or systems.

The one or more user devices 140 (e.g., smartphones, tablets, computers, etc.) may be used by a user to perform various actions (e.g., proofs) and/or access various types of data, some of which may be provided over a network 130 (e.g., the Internet, LAN, WAN, etc.). The term "user" as used herein may refer to an individual operating user devices 140, interacting with the data sources 160 and the traceability system 110 to trace and perform proofs on postures of entities or organizations. The user devices 140 may be used to send data to the traceability system 110, data sources 160, or may be used to access websites (e.g., using an internet browser), access applications (e.g., using a mobile application), and/or any other types of content.

For example, a user, whether an individual, an entity, or an organization, can utilize the user devices 140 to conduct numerous operations related to the traceability system 110. The user devices 140 can submit proof requests, perform proof operations, and access the results. They can navigate through the obfuscated data structures, apply their cryptographic keys, and traverse through the leaves, branches, and root of the data structure. This interaction provides them with an enhanced level of assurance about the current status of their account, the entity's solvency, or any other specific aspect of the entity's operation that is being validated.

The user device 140 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, etc.). User device 140 may also include an input/output circuit for communicating data over network 130 to traceability system 110 and/or data sources 160. In some arrangements, the one or more user devices 140 can be designed to submit proof requests to the traceability system 110. These proof requests could be related to a wide range of aspects concerning the entity's operations, such as a request for a proof of assets or a proof of liabilities. Upon the submission of a proof request, the traceability system 110 generates and provides a cryptographic proof dataset. The user can then use this dataset to conduct the proof operation, traversing through the data structure to validate the relevant information. If the operation is successful, the system can relay a successful proof status, confirming the requested information without revealing any sensitive or obfuscated details.

The one or more data sources 160 may include data collected by the traceability system 110 by receiving traceability data (e.g., transactions such as buying and selling of bonds, proof information, regulatory information) from the plurality of devices and/or systems 110 and 140. For example, as transactions occur, regulatory changes are introduced, or proof requests are fulfilled, the data sources 160 can provide updated data that reflects these changes. This updated data is then integrated into the existing data structure, maintaining its accuracy and reliability. This enables real-time or near-real-time verification and proof of various aspects of an entity's operations, bolstering transparency while ensuring privacy and security.

The traceability system 110 may include one or more systems (e.g., computer-readable instructions executable by a processor) and/or circuits (e.g., ASICs, Processor Memory combinations, logic circuits, etc.) configured to perform various functions of the traceability system 110. In some arrangements, the traceability system 110 may be or include an obfuscation system 112, an proof system 114, and a ledger manager system 116. It should be understood that various implementations may include more, fewer, or different systems than illustrated in FIG. 1, and all such modifications are contemplated within the scope of the present disclosure.

First, referring to the traceability system 110 generally. In one example, the traceability system 110 can be configured to provide real-time monitoring of an entities Total Loss-Absorbing Capacity (TLAC) (e.g., with tier 1 and tier 2 equity being tokenized). TLAC can be defined as:

$$\frac{TLAC \text{ Instruments}}{\text{Risk Weighted Assets } (RWA)} \geq X;$$

and $$\frac{TLAC \text{ Instruments}}{\text{Leverage Exposure Measure}} \geq Y$$

where X is 18% (or what a regulation sets X to be), and Y can be 6.75% (or what a regulation sets Y to be).

Tokenizing these equities aids in the quantification of financial resources available to absorb losses, providing a reliable measure of an entity's financial stability. The tokenization enables the secure digital representation of these equity tiers on the blockchain, allowing easy tracking, auditing, and verification of these assets within the traceability system 110. The traceability system 110, using its capacity for tokenizing assets and creating obfuscated data structures, could generate unique cryptographic outputs for Tier 1 and Tier 2 equity of a financial entity, representing them within a Merkle tree or similar data structure. Each cryptographic output would be dynamically updated, reflecting real-time changes in the value or status of the corresponding equity, enabling constant monitoring. A regulatory body or an automated system could then traverse this data structure at any given time, providing real-time insights into the entity's Total Loss-Absorbing Capacity (TLAC) by verifying the aggregate value at the root of the tree, thus enhancing financial transparency and stability.

In another example, the traceability system 110 can be configured to automate the verification of customer assets in the mortgage underwriting process based on the obfuscation architecture. Customer assets and liabilities can be tokenized, creating an immutable, verifiable record on the blockchain. This process can include tokenizing various types of assets like bonds, stocks, or money market accounts. The traceability system 110, can utilize quantum-resistant digital signatures, and can issue cryptographic proofs of these tokenized assets and liabilities, providing a robust and trustworthy mechanism for automated asset verification. The proofs can serve as digital confirmations, providing an immutable, verifiable record of the customer's financial status on the blockchain. These cryptographic proofs are then utilized by the underwriting system, a third-party machine, which analyzes this information, alongside other factors like credit history and income, to arrive at a comprehensive and accurate underwriting decision. By integrating this data, the underwriting process becomes more secure, reduces manual errors, and facilitates faster, more efficient lending decisions.

In yet another example, the traceability system 110 can be configured to facilitate machine-to-machine credit verification, a component in the provision of credit and financial services. By automating credit risk decisions based on cryptographic proofs of an entity's on-chain solvency, the system can make accurate and efficient credit provision decisions. This real-time solvency verification provides a tool for managing credit risk and allows for a more fluid extension of credit or services. In the machine-to-machine credit verification process, the first machine, such as a lender's decisioning system, initiates a credit verification by issuing a proof request to the traceability system 110 for a customer's or entity's tokenized assets. The traceability system 110, serving as the second machine, employs its obfuscation system 112, proof system 114, and ledger manager system 116 to generate cryptographic proofs corresponding to these tokenized assets. These proofs, which confirm the existence and value of the customer's or entity's assets, are then transmitted back to the initial requesting system, thereby facilitating a swift, automated decision on extending credit or services based on the validated solvency of the customer or entity.

In yet another example, the traceability system 110 can provide cryptographic proof of tokenized assets needed to meet the rule-based qualifications for accredited investor designation. By tokenizing assets and liabilities and proving their existence and value cryptographically, the traceability system 110 can grant an on-chain credential that signifies the status of an accredited investor. When the designation of an accredited investor is sought, the traceability system 110 leverages its obfuscation system 112 and proof system 114 to perform cryptographic proofs on the tokenized assets and liabilities. The proof system 114 generates a cryptographic proof which is a reliable attestation to the existence, value, and ownership of the tokenized assets. This proof, being tamper-resistant and verifiable, carries significant weight in the accreditation process. Concurrently, the system can also checks the proof against regulatory requirements, validating if the asset ownership and value meet the thresholds set for accredited investor status. Upon successful validation, the traceability system 110 generates an on-chain credential, effectively a digital badge, that signifies the status of an accredited investor. This badge, a cryptographically secure digital representation of the investor's status, can be securely shared with investment platforms or regulatory bodies, thereby providing a trustworthy and efficient method of verifying accredited investor status. It's important to note that throughout this process the privacy of the investor is protected.

The obfuscation system 112 can be configured to generate data structures, which contains obfuscation account and/or asset information. The obfuscation can occur by implementing a cryptographic function which transforms plain data into a format that conceals its original content, ensuring that even though the data is used within the tree structure, the original, sensitive information remains secure and private. In various arrangements, the obfuscation process involves the application of cryptographic functions to the input data, which conceals and protects the original content and creates a format that cannot be deciphered without the correct decryption key. In creating these obfuscated data structures, the obfuscation system 112 might utilize techniques such as hashing or encryption. Hashing transforms the input data into a fixed-size string of characters, which does not reveal any information about the input data itself. Encryption, on the other hand, scrambles the input data according to a specific algorithm and an encryption key, creating a cipher that can only be decrypted using the corresponding decryption key.

For example, in the context of a financial entity, the obfuscation system 112 could take a list of all users' accounts and their balances and convert this information into a cryptographically secure format. This might involve aggregating the username and account number, and applying a cryptographic function to this data. Then, the obfuscation system 112 can aggregate the first output and the account balance, and apply a cryptographic function to this data. The resulting output is an obfuscated representation of the user's account information that maintains the original data's integrity while keeping its content secure. In the process of creating a data structure like a Merkle tree, the obfuscation system 112 generates obfuscated leaf nodes from the processed user data. Each leaf node in the tree represents a specific user account or an asset of the entity, but in an obfuscated manner that maintains user privacy. The leaf nodes can then be aggregated to generate the upper-level nodes of the tree, ultimately leading to a root node that represents the entire data structure's aggregate value. In general, the obfuscation system 112 operates with an emphasis on maintaining the balance between user privacy and data utility. Even though the data is obfuscated, the original values are not lost and can be accurately verified using the correct keys, which is used in the proofing process. This design, along with the inherent properties of the utilized data structures and cryptographic functions, ensures that even as users or third-parties traverse the tree or verify their proofs, the privacy and security of all involved parties remain uncompromised.

In various arrangements, the obfuscation system 112, besides using encryption and hashing techniques, can also be configured to implement quantum-proof digital signatures, providing an extra layer of security in post-quantum computing era. In this regard, quantum-proof digital signatures use cryptographic algorithms that are resistant to quantum computer attacks, providing a robust and future-proof solution for maintaining data privacy and integrity. These signatures are generated using mathematical problems that are currently infeasible to solve even with the computational power of quantum computers, thus ensuring the secure obfuscation of account and asset information. In some arrangements, besides quantum-proof signatures, alternatives could include other post-quantum cryptographic techniques such as lattice-based cryptography, hash-based cryptography, or code-based cryptography, which also offer resistance against quantum computing threats. These alternatives, when employed within the obfuscation system 112, ensure that even with the advent of quantum computers, the obfuscated data structures generated remain secure and private, preserving user privacy and enhancing data utility. It should be understood that while the obfuscation system 112 is primarily illustrated as tokenizing assets, it can also tokenize other financial elements, such as liabilities, equity, or various financial products and documents.

The proof system 114 can be configured to receive proof requests and generate cryptographic proof datasets used for performing proofs of assets, liabilities, solvency, etc. By processing the data structures created by the obfuscation system 112, it generates a cryptographic dataset that enables users or third-parties to validate data, without compromising on the privacy of the obfuscated data. For example, upon receiving a proof request from a user or a third-party auditor, the proof system 114 retrieves, via the ledger manager system 116, the associated obfuscated data structure directly from the ledger system 125, which stores a secure record of all data structures. These structures, such as Merkle trees or other data constructs, represent an entity's financial position or a specific customer's assets. Once the relevant data structure is retrieved, the proof system 114 generates a cryptographic proof dataset. This dataset constitutes the package of information needed by the requesting party to traverse the obfuscated data structure and verify the sought-after information. For instance, in a proof of assets request, this dataset would enable the user to confirm that their assets are correctly accounted for within the entity's broader asset balance.

The ledger manager system 116 can be configured to generate various blocks and broadcast exchanges, such as new blocks to the ledger system 125. For example, the ledger manager system 116 can be configured to receive the generated data structure from the obfuscation system 112 and in turn, broadcast the data structure with the requisite information to a blockchain ledger stored on ledger system 125. As such, ledger manager system 116 is configured to execute the handling, recording, and distribution of the obfuscated data structures generated by the obfuscation system 112. In various arrangements, the ledger manager system 116 interacts directly with the ledger system 125, where all the blockchain records are securely stored. Upon receiving a data structure from the obfuscation system 112, the ledger manager system 116's can add this structure to the distributed ledger or blockchain stored in ledger system 125. This can include creating a new block that houses the new or updated data structure, subsequently linking it to the existing chain of blocks. In various arrangements, in addition to managing the insertion of new blocks, the ledger manager system 116 also handles the retrieval of data structures for various operations, like proof generation. When a proof request comes in, the ledger manager system 116 retrieves the relevant obfuscated data structure from the blockchain ledger and supplies it to the proof system 114. Moreover, the ledger manager system 116 can broadcast updates about the blockchain ledger to the relevant parties.

The obfuscation database 120 can be a secure repository for sensitive and protected information related to the account holders or users of a financial entity or another organization. The obfuscation database 120 stores information such as usernames, account numbers, balances, and any other private details, current liabilities, securities, all of which are subject to strict privacy and security regulations. In some arrangements, the obfuscation system 112 fetches the information from the obfuscation database 120 when needed, such as when creating obfuscated data structures. For example, if the obfuscation system 112 is tasked with creating a Merkle tree to represent all users' accounts or all bank liabilities, or all assets of an organization, it retrieves the requisite information (e.g., account information) from the obfuscation database 120. This raw or unprotected information is then subjected to one or more cryptographic functions which transform it into a format that conceals its original content. This obfuscated data can then be used to create the leaf nodes in the Merkle tree, ensuring that the structure can function effectively without exposing sensitive data.

In some arrangements, the ledger system 125 can be implemented in various ways. For example, the ledger system 125 can be configured as a parallel execution system. That is, when a new capital asset is purchased or exchange for, the ledger manager system 116 can issue a digital twin of the asset on the blockchain. This digital twin serves as an alternate, immutable record of the asset, in a format that retains all the information while maintaining privacy and security. For instance, if a bond is bought, the ledger manager system 116 can mint a new token representing the bond. Similarly, if the bond is sold, the corresponding token can be redeemed or destroyed, ensuring an accurate representation of the current asset status on the blockchain.

In another example, the ledger system 125 can be configured as a parallel data duplication system. That is, the ledger system 125 can mirror the final reporting from the financial entities books and records systems on-chain. This results in a parallel blockchain, acting as a ledger shadowing the existing assets stored in the traditional systems. Every transaction or change in the traditional system can get hashed and recorded on the blockchain. This approach allows for the existing books and records system to remain unaltered while leveraging the advantages of blockchain technology for providing proofs and verification.

In yet another example, the ledger system 125 can be configured as a complete digital system. Under this system, the books and records system of the financial entity could be removed, with all transactions and asset management occurring digitally. That is, every transaction and asset, tokenized or otherwise, would exist and operate within the blockchain environment.

Referring to the ledger system 125 generally. The ledger system 125 can include a key dataset and a digital ledger. The ledger system 125 can be configured to store and/or maintain any of the information described herein. In some arrangements, the described ledger system and methods involve utilizing one or more processing circuits. The one or more processing circuits allow receiving, collecting, and sending of data, exchange or update requests, public and private key pairs, smart contracts, and so on. The one or more processing circuits can then communicate with one or more nodes of the digital ledgers and execute one or more smart contracts stored on the nodes to perform various changes (e.g., update a Merkle tree).

In various arrangements, the key datasets can include a plurality of public and private key pairs (referred to hereafter as "key pairs"). In some arrangements, the ledger system 125 can include a hardware security module (HSM) that can manage cryptographic keys. Each key pair can be stored in the key dataset utilizing a cryptographic function. For example, the cryptographic function could be a homomorphic encryption function. In another example, the cryptographic function could be any symmetric encryption function (e.g., Triple Data Encryption Standard (TDES), RC5, Advanced Encryption Standard (AES), Blowfish, CAST, and so on), and/or asymmetric encryption function (e.g., Rivest-Shamir-Adleman (RSA), Efficient and Compact Subgroup Trace Representation (ECSTR or XTR), Digital Secure, Escrowed Encryption Standard (EES), and so on). In some arrangements, the private key can be used to encrypt data (e.g., using a cryptographic function) at the source system (e.g., ledger system 125) when an exchange occurs (e.g., send digital asset from a source address to a destination address). In various arrangements, the public key can be used by the destination system (e.g., user devices 140) to decrypt the encrypted digital data (e.g., asset, liability, security, etc.). In some arrangements, the one or more digital ledgers (e.g., blockchains of Merkle trees or other data structures) of the ledger system 125 can include a plurality of nodes configured to store a copy of one or more digital data, such as assets or liabilities. In various arrangements, each node may contain a copy of an individual digital data associated with an account of a financial entity. Each individual digital asset may have one or more fields.

Figure 2:
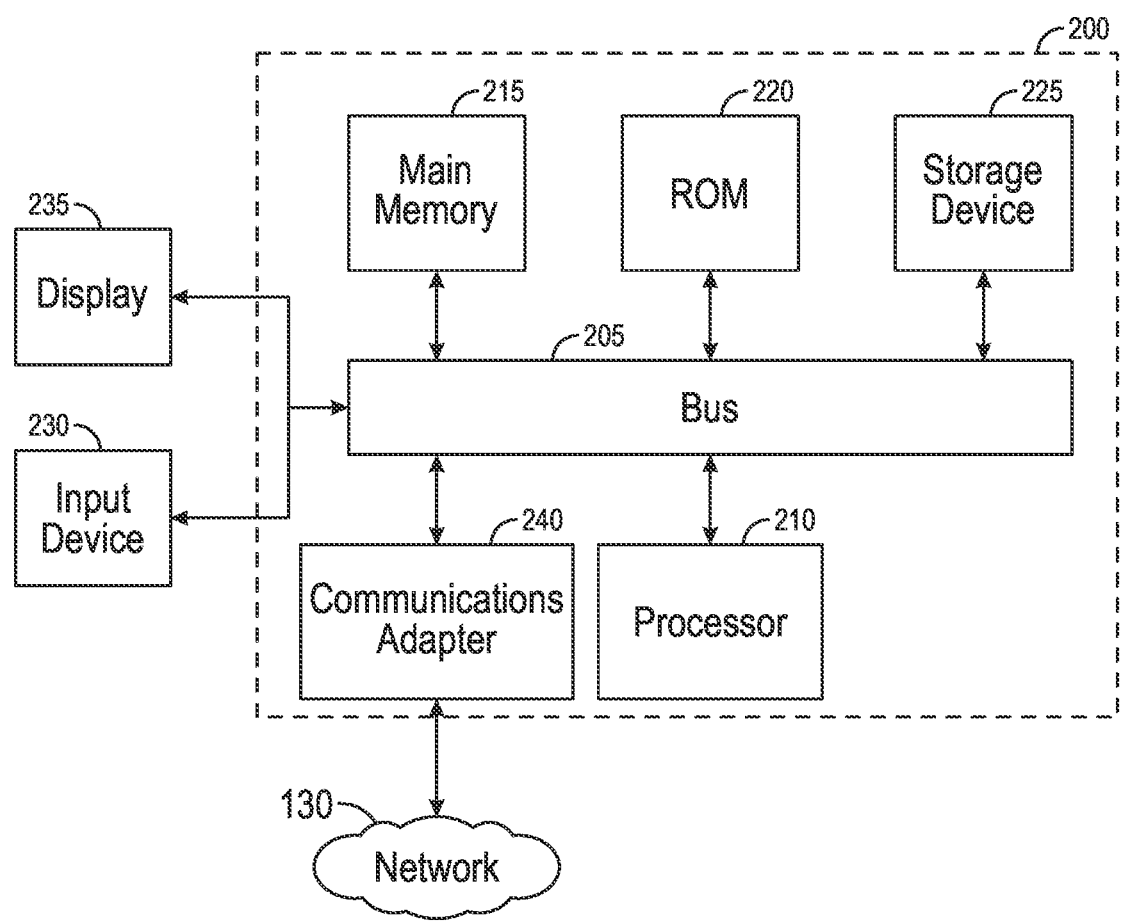
FIG. 2 is a block diagram illustrating an example computing system suitable for use in the various arrangements described herein.

Referring now to FIG. 2, a depiction of a computer system 200 is shown. The computer system 200 that can be used, for example, to implement a computing environment 100, traceability system 110, user devices 140, data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 may further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 may be coupled via the bus 205 to a display 235, such as a liquid crystal display, or active matrix display, for displaying information to a user. An input device 230, such as a keyboard including alphanumeric and other keys, may be coupled to the bus 205 for communicating information, and command selections to the processor 210. In another arrangement, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some arrangements, the computing system 200 may include a communications adapter 240, such as a networking adapter. Communications adapter 240 may be coupled to bus 205 and may be configured to enable communications with a computing or communications network 130 and/or other computing systems. In various illustrative arrangements, any type of networking configuration may be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement may also be employed to execute the instructions contained in main memory 215. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 2, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 2 as singular, stand-alone devices, one of ordinary skill in the art will appreciate that, in some arrangements, the computing system 200 may comprise virtualized systems and/or system resources. For example, in some arrangements, the computing system 200 may be a virtual switch, virtual router, virtual host, virtual server. In various arrangements, computing system 200 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

Figure 3A:
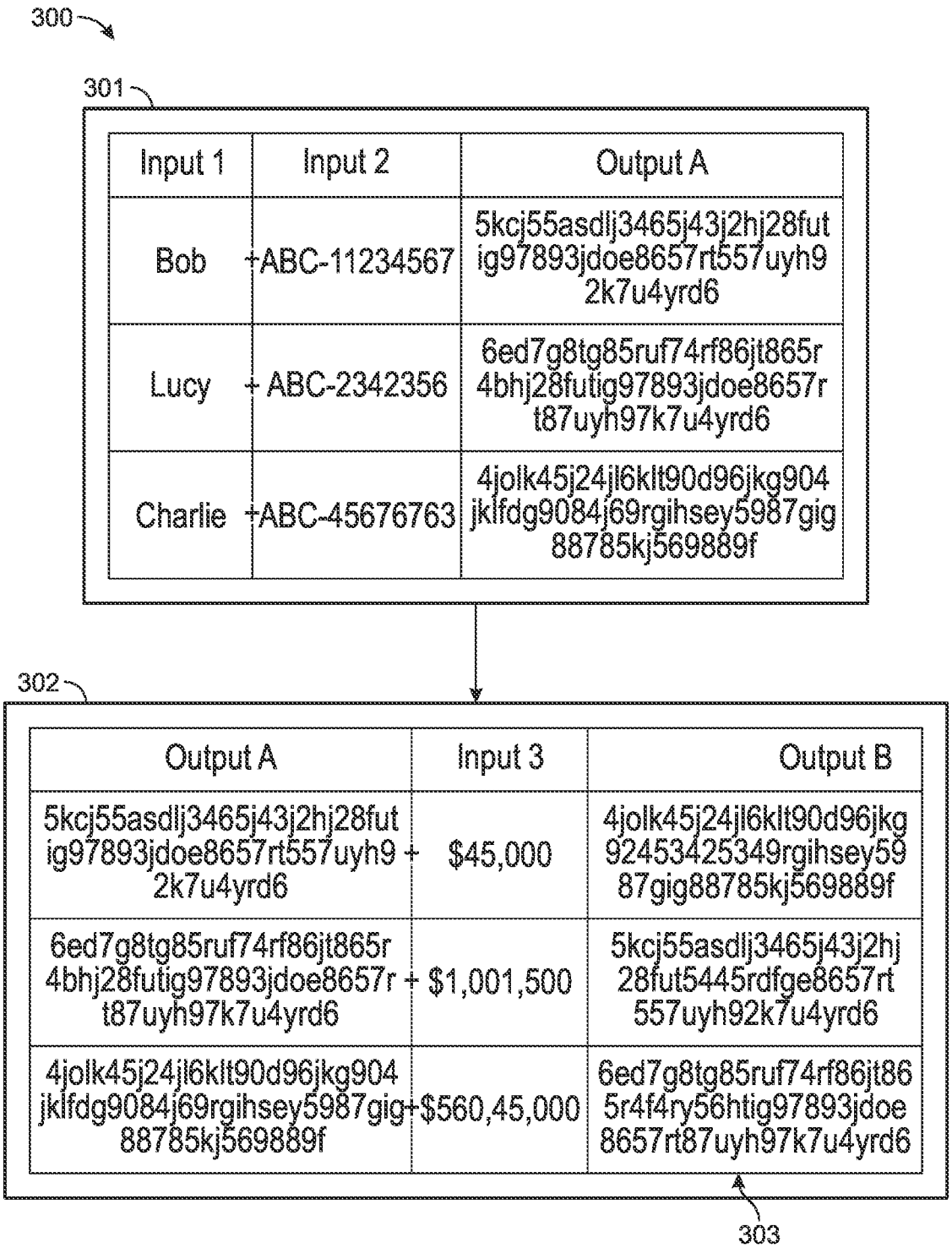
FIGS. 3A-3C are example illustrations of the obfuscation architecture, according to some arrangements.

Referring now to FIG. 3A, the process of creating cryptographic leaves of an entities tokenized assets 300 is shown, according to some arrangements. In various arrangements, the obfuscation system 112 can generate the tokenized assets 300. For example, at block 301 (stage one), the obfuscation system 112 can generate or collect a list of all users accounts and their balances (e.g., stored in obfuscation database 120 or on a ledger of the ledger system 125). As shown, each account can have an ID or username (Input 1, e.g., Bob, Lucy, Charlie) and an account number (Input 2, e.g., ABC-11234567) which can be aggregated together and hashed to generate an Output A (e.g., quantum-resistant signatures, etc.). The result of this operation is a unique Output A, which could take the form of quantum-resistant signatures, hash values, or any other suitable cryptographic construct.

Besides hashing, one alternative is symmetric encryption which uses a single key to both encrypt and decrypt the data. Another option is employing cryptographic algorithms like RSA or ECC. Aggregation refers to the combination of different pieces of data into a single data point. This can be done through several methods such as concatenation, wherein the data points are linked end-to-end to form a longer string of data, or by using a more complex function such as bitwise XOR (exclusive or) operation, where binary data from the data points is combined in a way that each bit of the output is the same as the corresponding bit in one but not both of the inputs. Another option might involve the use of secure cryptographic techniques, such as generating a hash from the combined data points, which offers a high level of security and ensures that the output is unique to the specific set of inputs.

Additionally, in the above example, at block 302 (stage two), the obfuscation system 112 can aggregate together Output A and the users account balance (Input 3) and has the aggregation to receive Output B (103). Accordingly, Output B (103) of each customer can be stored as a leaf in the data structure of the entity. This data structure, potentially a Merkle tree, hash tree, or any other suitable data structure, is populated with these cryptographic leaves, each one a unique, secure representation of a tokenized asset.

Figure 3B:
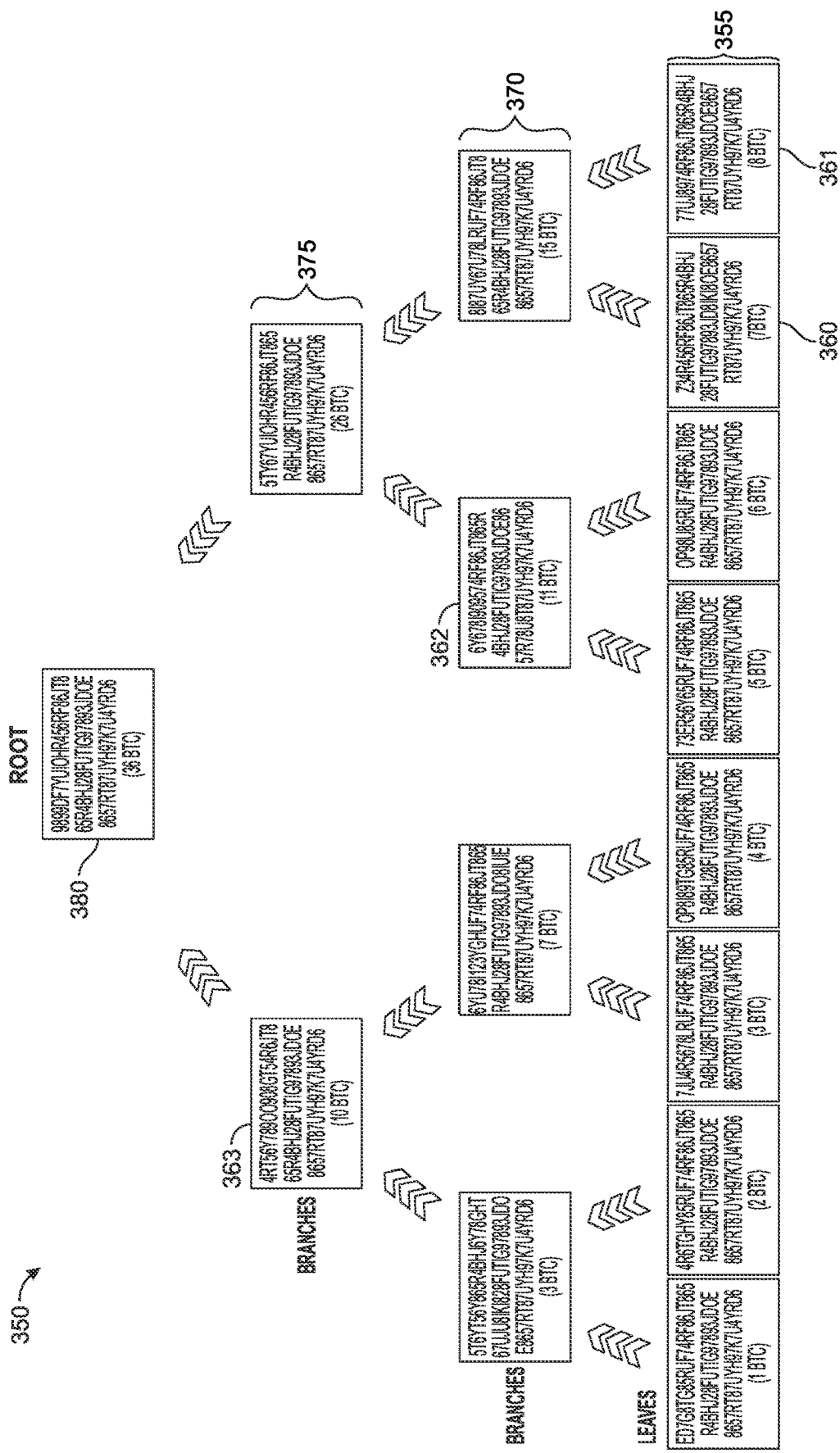

Referring now to FIG. 3B, a data structure 350 is shown, according to some arrangements. In various arrangements, the obfuscation system 112 can generate the data structure. The data structure 350 can take the form of a Merkle tree. This tree-like structure comprises numerous leaves and branches, each with a specific role. For example, every leaf in this tree can be associated with an asset, such as 1 Bitcoin (BTC), 8 BTC, or other cryptocurrencies. Each these leaf node are cryptographic outputs 355 which represent an obfuscated version of the assets. Each branch within the Merkle tree can signify an aggregate amount of the child assets. For instance, if there are two child nodes valued at 2 BTC and 6 BTC respectively, the parent node (or branch) would represent an aggregate value of 8 BTC along with a unique cryptographic output that is derived from the child nodes. The root node 380 of the Merkle tree is configured to be a representation of the entire aggregate value of the assets, liabilities, securities, or any other cryptographic outputs stored within the tree structure. This root serves as an overarching signature of the total content of the tree, ensuring data integrity and facilitating verification.

For example, leaves 360 and 361 in the tree structure can be aggregated together, and a cryptographic function can be applied to determine the branch cryptographic output of leaves 360 and 361. Alternatively, these leaves can be cryptographically combined without aggregation, which still yields a branch cryptographic output. The resulting branch cryptographic output can then undergo another level of aggregation and combination, this time with branch 362, using a cryptographic function. This process results in a new branch output, which represents the combined value of the branch of leaves 360 and 361 along with branch 362. In the final stage of this example, the new branch cryptographic output can be aggregated and combined using a cryptographic function with branch 363. This process results in another branch output, the root 380, which captures the entire aggregate value of the data structure 350 (e.g., 36 BTC).

In another example, bonds, which are a type of fixed income security that serves as a promise from an entity, often a corporation or government. In this arrangement, the entity assures to return a specified amount of money along with interest to the bondholder after a specific period. These debt securities can be tokenized and broadcasted to a distributed ledger, converting the bond's value into a digital form. This digitized form can then be included as a leaf in the data structure, with the bond's value and maturity date serving as key components of the associated cryptographic output. The data structure can therefore offer real-time transparency about the bond's status, including its current value and the remaining time until maturity.

A third-party or regulator, interested in reviewing specific types of bonds such as 10-year or 30-year bonds, could do so within the data structure. In some arrangements, the obfuscation system 112 could regenerate the entire Merkle tree to sort by bond type. In various arrangements, the obfuscation system 112 could generate separate Merkle trees for each bond category, each with its root, branches, and leaves. These individual trees represent the aggregated values of each bond category, allowing the third-party or regulator to select a specific tree (e.g., the 10-year or 30-year bond tree) for detailed review. This maintains the efficiency of the traceability system 110 while providing granularity and flexibility for third-parties or regulators to review the bonds that interest them, without having to navigate through an entire tree of mixed bond types.

As an alternative to creating separate trees for different bond types, the obfuscation system 112 could incorporate multiple bond types within a single leaf's cryptographic output. In this arrangement, each leaf's cryptographic output would not only represent the aggregated value of a bond portfolio but also encapsulate the individual bonds themselves, each tagged with its unique bond type. For this, the cryptographic function used would output multi-tiered obfuscated data. When a regulator or third-party wishes to review specific bond types, they can traverse the tree using a specific decryption mechanism tailored to extract and analyze the specific bond types. This approach retains all bond information within one comprehensive data structure, while providing a means for regulators to dissect and inspect bonds of interest efficiently.

In yet another example, stocks or shares representing ownership in a company are assets that signifies a portion of a company's equity and can be converted into digital form using similar tokenization processes as used for bonds. The digitized stock can be assigned a unique cryptographic output, which is then included as a leaf in the data structure. This cryptographic output could include information like the current value of the stock, the number of stocks held, and the specific company they pertain to. The data structure thus offers a transparent view of the stock's real-time status while maintaining the confidentiality of specific details linked to the investor. Thus, in a proof of assets scenario, an investor could verify the existence and value of these tokenized stocks in their portfolio.

In yet another example, in the context of home mortgages, each leaf in the data structure can represent an individual mortgage account. This leaf, or cryptographic output, would represent the equity a homeowner has in their property. For example, if a homeowner has repaid half of their mortgage loan, they have built 50% equity in their home, and this would be the value represented by the cryptographic output associated with their mortgage account. The equity values represented by individual accounts (leaves) are then combined or aggregated upwards through the tree structure, contributing to the total equity value represented by the parent nodes, and eventually, the root. The root of the tree in this context would represent the aggregate equity of all mortgages held by the financial entity. This gives an effective and transparent picture of the total equity held in all homes under the entity's mortgage portfolio. As the homeowner continues to repay their mortgage, the equity in their home (and therefore the value represented in the associated leaf) would increase, dynamically updating the values of the parent nodes and root. Therefore, at any given time, the root of this data structure offers a real-time snapshot of the total home equity across all mortgages managed by the entity, while still preserving the privacy of individual homeowner details.

Figure 3C:
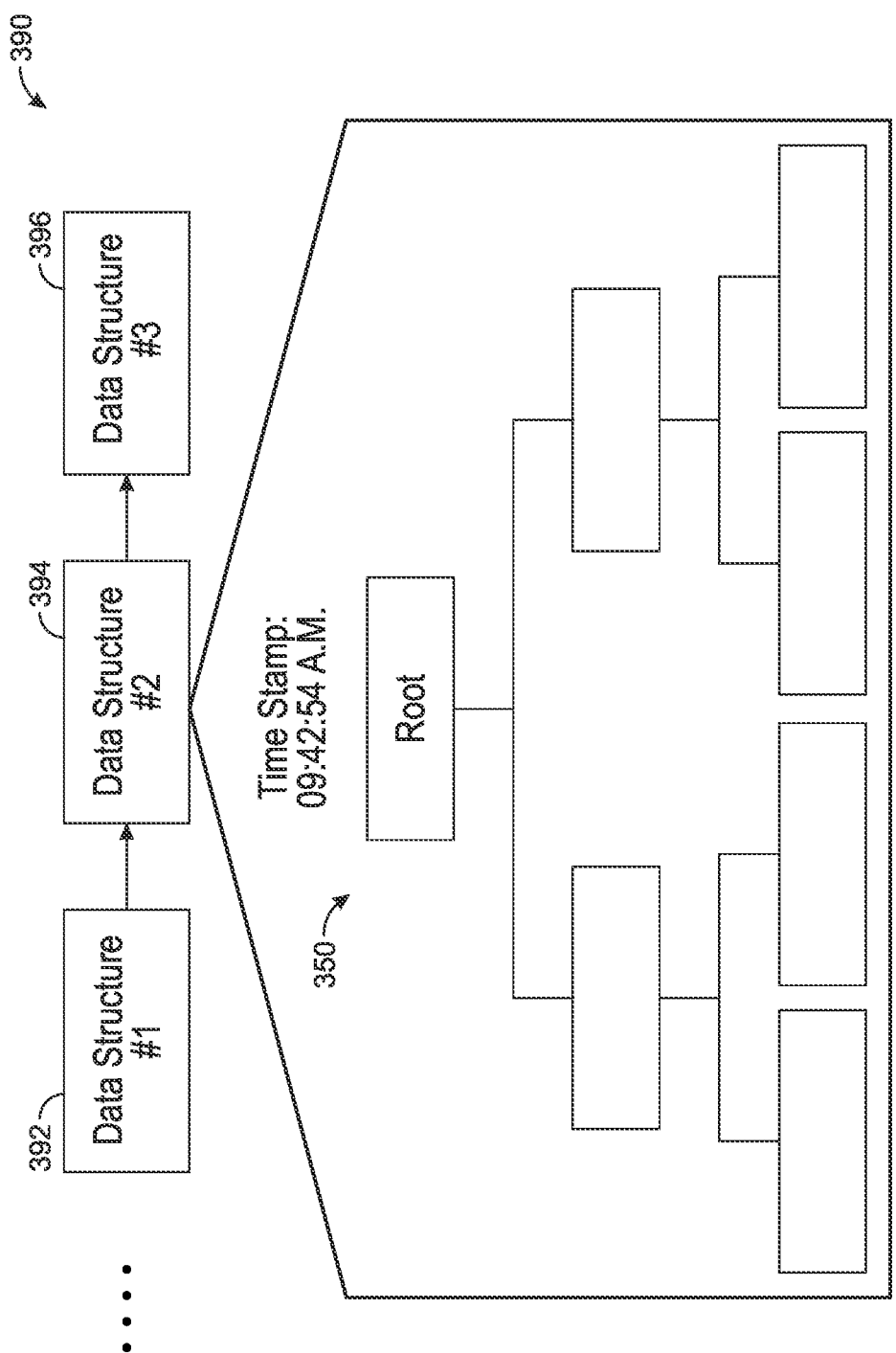

Referring now to FIG. 3C, a distributed ledger architecture 390 is shown, according to some arrangements. As shown, the distributed ledger architecture 390 includes blockchain block 392, blockchain block 394, and blockchain block 396. Each distributed ledger or blockchain can store a data structure, multiple data structures, or a piece of a data structure (e.g., if the data structure is too large in size that it needs to be stored on more than one block). The distributed ledger or blockchain can be stored in ledger system 125 and the ledger manager system 116 can execute and interact with the ledger system 125 to update distributed ledgers, create new distributed ledgers, access the distributed ledgers, etc. For example, data structure 350 of FIG. 3B can be stored in blockchain block 394. Each time a data structure is updated, the ledger manager system 116 can broadcast the new or updated data structure to the distributed ledger and add a new block to the chain of blocks.

As shown, the distributed ledger architecture 390 includes a series of interconnected blocks, blockchain block 392, blockchain block 394, and blockchain block 396, forming the blockchain infrastructure. In various arrangements, the distributed ledger architecture 390 is adaptability and can be scaled, being able to accommodate a data structure within a single block, distribute a single data structure across multiple blocks, or even host multiple data structures within a block depending on the size and complexity of the data structures. In the context of the ledger system 125, can store data structures in a secured and transparent manner. This process is managed by the ledger manager system 116, which carries out functions such as creating new distributed ledgers, accessing existing ones, updating them, and broadcasting these updates.

In reference to data structure 350 from FIG. 3B, it can be exemplified how it might be stored in blockchain block 394. Here, each leaf of the data structure, being a unique cryptographic output, corresponds to a unique set of customer or entity data (e.g., posture), securely protected within the confines of the block. As the data structures evolve, with the addition, modification, or deletion of data, the ledger manager system 116 can perform executions. It broadcasts these changes to the distributed ledger and can append a new block to the existing chain, capturing a snapshot of the data structure at that specific moment in time.

Figure 4:
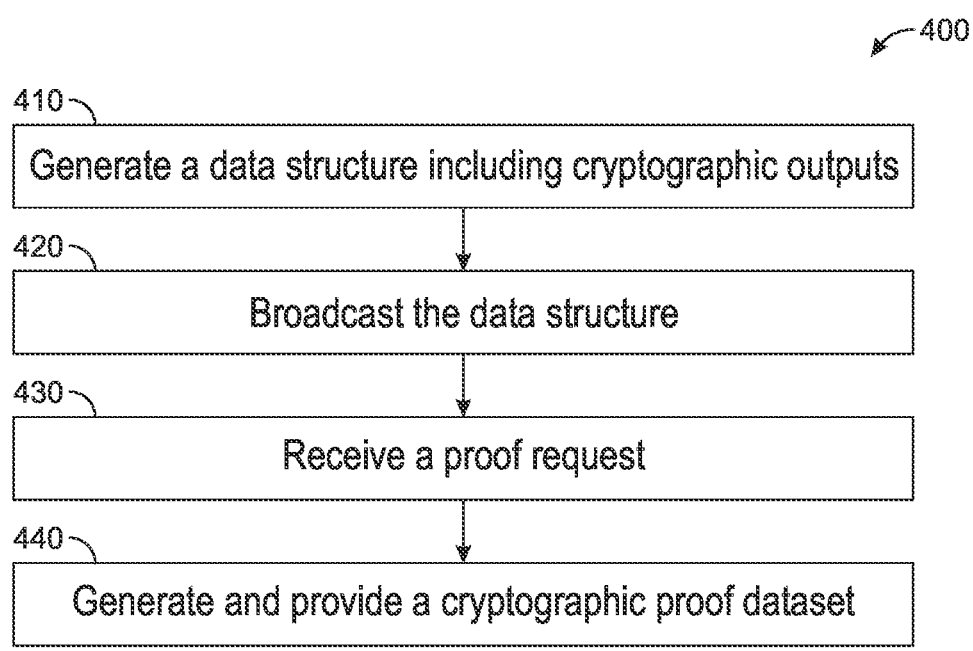
FIG. 4 is a flowchart for a method to trace obfuscated data of an entity, according to some arrangements.

Referring now to FIG. 4, a flowchart for a method 400 to trace obfuscated data of an entity is shown, according to some embodiments. Traceability system 110 can be configured to perform method 400. Further, any computing device described herein can be configured to perform method 400.

In broad overview of method 400, at block 410, the one or more processing circuits (e.g., traceability system 110 in FIG. 1) can generate a data structure including cryptographic outputs. At block 420, the one or more processing circuits can broadcast the data structure. At block 430, the one or more processing circuits can receive a proof request. At block 430, the one or more processing circuits can generate and provide a cryptographic proof dataset. Additional, fewer, or different operations may be performed depending on the particular arrangement. In some embodiments, some, or all operations of method 400 may be performed by one or more processors executing on one or more computing devices, systems, or servers. In various embodiments, each operation may be re-ordered, added, removed, or repeated.

In general, method 400 solves current problems related to a profound lack of real-time transparency leading to a sudden crisis of confidence among stakeholders. Stakeholders, from investors to depositors, often grapple with a chronic information deficit, unsure about the solvency of an entity. After all, it is critical to know whether an entity can repay advances or not. Currently stakeholders rely on financial statements of companies. However, these are not daily updates, and there exists an inevitable time lag between their release and the corresponding reaction from an investor or customer. This problem is what method 400 intends to address, by facilitating continuous confidence in an entity's ability to meet its obligations such as the Total Loss-Absorbing Capacity (TLAC), among other things, or executing proofs that perform customer asset verification, machine to machine credit verification, or Qualified Purchaser status, among other things.

Importantly, while method 400 increases transparency about an entity's financial data (e.g., posture), it also safeguards customer data privacy by obfuscating sensitive details, offering a paradigm shift in achieving financial transparency without compromising data security. Furthermore, carrying out actions such as validating a Qualified Purchaser status can be a labor-intensive and time-consuming process for financial entities. The traditional steps involve a detailed review of an investor's financials, a complex verification of their assets and liabilities, and ensuring they meet the legal requirements, all of which can significantly delay the investor's participation in investment opportunities. Thus, by employing the obfuscation architecture described herein and executing method 400, the validation process of a Qualified Purchaser's assets and liabilities is improved, offering real-time traceability and thereby accelerating the overall investment process. As described below in method 400, the processing circuits can determine weather information or data related to a distinct account or identifier is embodied in a unique cryptographic output tied to a database, ledger, or system of a provider.

Currently, while the Federal Reserve has knowledge of the reserves held by individual banks, it lacks visibility into their complete books and records. Our proposed system fills this gap, providing real-time solvency verification while ensuring necessary obfuscation to protect sensitive information. For example, the improvements represented and implemented in method 400 provide verifiable and traceable assets without revealing any customer-protected information. In particular, the only shared information would be unprotected data such as cryptographic outputs, ensuring customer privacy while maintaining full transparency of an entity's asset health. This unique combination of privacy and transparency maintains stakeholders' trust and confidence, thereby significantly reducing the probability of events such as a deposit run, and fostering a more stable financial ecosystem.

At block 410, the one or more processing circuits can generate a data structure including a plurality of cryptographic outputs, wherein each of the plurality of cryptographic outputs obfuscates data of at least one identifier of the entity. In various arrangements, the identifier can be account information or customer information (e.g., account number, account id, user name). This data structure is implemented to hold and manage multiple cryptographic outputs. The cryptographic outputs, as used in this context, are outputs of various cryptographic functions. These may include, but are not limited to, hash functions, digital signatures, encrypted messages, or secure ciphers. In some arrangements, each cryptographic output is the result of a unique data transformation that effectively masks or obfuscates the original data. For example, the original data being obfuscated could relate to at least one identifier of the entity, where the identifier (or account) is associated with data identifying an economic or financial position of an entity such as solvency, assets, liabilities, or other related indicators. In other words, the entity's financial information is securely hidden through cryptographic transformation into the aforementioned outputs.

In some arrangements, the data structure utilized can be any framework employed to organize and store data, including but not limited to, a Merkle tree, a linked list, a hash table, a graph, or an array. The choice of data structure depends on the specifics of the system requirements and the nature of the data being stored. Furthermore, the obfuscation of the data can serve a dual purpose. First, it can ensure the protection and privacy of sensitive financial information. Second, it can allow for the real-time tracking of an entity's or customer's financial data without exposing the raw (protected) data to potential security threats or privacy breaches.

In various arrangements, the process of data obfuscation and the subsequent generation of a data structure including a multitude of cryptographic outputs provide for real-time asset traceability. For example, the processing circuits can execute a set of programmed instructions to generate this data structure. The process can involve converting original financial data, or "postures" of the entity, into cryptographic outputs, and subsequently storing these outputs in the data structure. The transformation of data (e.g., including identifiers, account information, and postures, such as account balances) into cryptographic outputs can employ cryptographic functions. The choice of function can be based on the requirements of the system and the nature of the data, with considerations for computational efficiency, security level, and the desired form of the output.

A hash function, for example, could be used to convert each piece of financial data into a unique string of characters, a "hash", that represents the original data. This transformation is unidirectional, meaning the original data cannot be derived from the hash. It provides a high level of security and is computationally efficient. In another example, the processing circuits can use digital signatures or secure ciphers could be used. In particular, signatures and ciphers can not only transform the data but also provide mechanisms for verifying the authenticity and integrity of the data. Each cryptographic output generated is then stored in the data structure. For example, a Merkle could be used. In general, a Merkle tree is a type of binary tree wherein each leaf node is a hash of a block of data, and each non-leaf node is a hash of its child nodes. Alternatively, or in combination, a linked list or an array could be used. In such cases, each cryptographic output might be stored as a separate node or element in the structure, linked to others in a specific way.

In some arrangements, the generation of the data structure by the processing circuits can include several stages. For example, a first stage can include obfuscating first data and second data using a cryptographic function. In this example, the first data and the second data, which represent certain postures of the entity, are obfuscated using the cryptographic function to generate a first cryptographic output. The first data and second data are inputs into the cryptographic function, which performs a series of operations on them, effectively transforming them into the first cryptographic output. This output is a unique representation of the first and second data, but in a form that is unintelligible without the corresponding decryption mechanism. In this example, following this, the process can execute a second stage. In this stage, the first cryptographic output and third data are obfuscated using the same cryptographic function to generate a second cryptographic output. This process is similar to the first stage, with the difference being the use of the first cryptographic output as an input, alongside the third data. Upon completion of the second stage, the third stage can entail updating the data structure to incorporate the second cryptographic output. The data structure can be dynamically updated to include this second cryptographic output.

In some arrangements, prior to the obfuscation of the first data and the second data, these pieces of information are aggregated using a first mathematical function. Aggregation here refers to the process of combining multiple data points into a single, summarized data point. This mathematical function could take many forms depending on the nature of the data and the specific requirements of the system. For example, it could be a sum function, or a statistical model that takes into account multiple variables and factors. In the above example, the first data and the second data could include customer account identification information. This could be a variety of different things, such as an account number, a customer ID, or any other unique identifier associated with a customer's account. By aggregating this data, the system is creating a summarized representation of the customer's account identity. The output of the aggregated data using a cryptographic function is unique to the input data. That is, any change in the input data, no matter how small, will result in a different output. In this example, the processing circuits executing the hash function would be configured to tokenize the account data, converting it into a unique and secure representation. Next, prior to obfuscating the first cryptographic output and the third data, these pieces of information are aggregated using a second mathematical function. This function could be different from or the same as the first mathematical function, depending on the system's needs. The third data in this example could be a customer account balance (i.e., a portion of the entities posture) associated with the customer account identification information. The aggregation of the first cryptographic output and the third data serves to create a summary of both the obfuscated account identification information and the account balance.

Still referring to the above example, the aggregated data can then be obfuscated using the same hash function to generate a second cryptographic output. This output is then stored in the data structure, joining the multitude of other cryptographic outputs. In some arrangements, the hash function used in this system can generate quantum-resistant signatures. That is, quantum-resistant signatures are designed to be secure even in the face of quantum computers. As shown, this process of generating a data structure by the processing circuits involve several layers of data aggregation, obfuscation, and cryptographic transformation, providing a secure and efficient mechanism for tracking the financial data of entities in real-time. It allows for the protection of sensitive information, while still allowing for the necessary transparency and traceability in the financial system.

In some arrangements, the processing circuits that generate the data structure might employ a different sequence of operations. For instance, a preliminary stage could involve integrating first data and second data using a mathematical function, thereby generating a merged datum. Both the first and second data can be combined via this function, resulting in an combined datum that encapsulates the information from both data sets. This combined datum serves as a coherent yet unintelligible representation of the first and second data. Subsequently, an intermediary stage can be executed where this combined datum is then obfuscated using a cryptographic function to produce a unique cryptographic output. This operation can include inputting the combined datum into the cryptographic function, transforming it into a cryptographically secure and unintelligible output. In the next stage, this cryptographic output could then be combined with a third datum using another mathematical function to create another combined datum. Just like before, the cryptographic output and third data are integrated, encapsulating both sets of information into a single output. In the final stage, this newly generated combined datum can again be obfuscated using the same or a different cryptographic function, generating a second cryptographic output. This second cryptographic output now incorporates information from the first data, the second data, and the third data in a cryptographically secure form. Lastly, the data structure could then be modified to include this second cryptographic output, facilitating the dynamic evolution of the data structure in response to the processing of new data, keeping the entire system up to date.

In another example, first data, second data, and third data could all be simultaneously obfuscated in a single operation, utilizing a cryptographic function capable of handling multiple inputs (or handling one input if the data is aggregated together). Accordingly, this method can bypass the need for individual obfuscation stages, enabling the generation of a single, unique cryptographic output that encapsulates all three data sets in a cryptographically secure manner. It should be understood that the generation of cryptographic outputs incorporated in the data structure is not confined to the methods delineated herein; a variety of techniques could be employed, attesting to the flexibility and adaptability of this approach.

In some arrangements, the data structure generated can be a Merkle tree, a binary tree structure. In general, a Merkle tree can include a root node, branches, and leaves, which are each various levels of the tree. Each leaf in the Merkle tree can be designed to store a cryptographic output, specifically, a leaf cryptographic output that is part of the multitude of cryptographic outputs generated by the processing circuits. Each leaf cryptographic output can correspond to a specific data set. For example, it might represent the hashed value of specific data of the entity, such as a customer's account balance that was hashed with cryptographically generated identification information (e.g., identifier, account information). Moving up the tree, the branches are nodes that hold the hashes of their child nodes. This means that each branch node can be a summary or aggregation of the information contained within its child nodes. The root node, at the top of the tree, holds a root cryptographic output. Unlike the leaf cryptographic outputs, which each represent a single specific data set, the root cryptographic output is a summary or aggregation of all the data contained within the tree. In other words, it's a single hash that represents all the other hashes in the tree. Additionally, any change to any piece of data in the tree will result in a different root cryptographic output. In this context, the root cryptographic output is designed to serve as proof of certain data (e.g., such as postures) of the entity. This could include but is not limited to proof of solvency (demonstrating that the entity has more assets than liabilities), proof of assets (showing the total assets the entity holds), proof of reserves (indicating the reserves the entity holds), or proof of liabilities (displaying the total liabilities of the entity). These proofs offer a way for the entity to demonstrate its financial standing without revealing sensitive details.

At block 420, the one or more processing circuits broadcast the data structure to a distributed ledger, making the data structure accessible to all participants in the blockchain network. Distributed ledgers, such as blockchains, are designed to store data across multiple nodes or systems, instead of in a centralized database. In various arrangements, broadcasting can include the process of distributing or propagating the data structure across a network (e.g., blockchain network). As used herein, "on-chain" refers to data or transactions that occur on the blockchain or distributed ledger. These transactions can be publicly verifiable and are permanently recorded on the blockchain. Therefore, on-chain solvencies, assets, reserves, and liabilities refer to those aspects of an entity's financial position that are recorded and verifiable on the blockchain. As described herein, each posture, which represents an aspect of the entity's or customer's financial or economic position, such as solvency, assets, reserves, or liabilities, is represented through an aggregate obfuscation. This means that the data representing these postures are aggregated and then obfuscated using a cryptographic function to create a cryptographic output. This process ensures that while the posture data is securely recorded on the blockchain, the specific details are obfuscated to maintain privacy and confidentiality.

In various arrangements, each posture can be associated with a plurality of accounts belonging to multiple customers of the entity. Each block in the blockchain or distributed ledger contains a certain amount of data, and in this case, it contains the data structure (e.g., Merkle tree) which consists of various cryptographic outputs representing the entity's financial postures. In the context of the Merkle tree, each leaf cryptographic output represents obfuscated customer account information of a particular customer. This obfuscated information could include various details related to the customer's account, such as the account balance or identification information, all securely obfuscated using a cryptographic function.

At block 430, the one or more processing circuits receive a proof request from a customer's computing system (or third-party computing system). In some arrangements, the proof request is related to the customer's unique cryptographic output, one of the many outputs stored in the data structure (e.g., the Merkle tree) that was previously broadcasted to the distributed ledger. For example, the customer's cryptographic output can be unique to that specific customer or specific account of the customer (e.g., investment account, savings account, checking account). This means that each customer can have one or more corresponding cryptographic outputs stored within one or more Merkle trees that represents an obfuscated version of data of their account, such as their account balance or posture with account information or another aspect of their relationship with the entity.

In general, the proof request can be from a customer or third party and the request can be directed towards, but not limited to, proof of solvency, proof of assets, and proof of liabilities. In the case of a proof of solvency, the request pertains to the financial soundness of the entity or bank. By utilizing the cryptographic proof dataset, the customer or third party can authenticate the bank's solvency status without exposing the details of individual customers' financial data. This proof aids in maintaining confidence in the bank's capacity to meet its financial obligations. For a proof of assets, the customer is seeking verification of their specific assets within the bank's overall asset pool. Here, the unique cryptographic output (e.g., such as a key) associated with the customer can be utilized. This key, for example, allows for the traversal of the data structure (such as a Merkle tree) up to the root node. If this traversal is successful and no inconsistencies are encountered along the way, the customer can be assured that their assets (e.g., stocks, money, or bonds) are duly accounted for within the bank's reported assets.

In some arrangements, in the case of a proof of liabilities, the request is associated with confirming the bank's total obligations. Using the distributed cryptographic proof dataset, the customer or third party can confirm the validity of the reported liabilities without compromising the obfuscated details of individual accounts. The requested proof, whether it's a proof of solvency, assets, or liabilities, can be represented digitally within the processing circuits, leveraging the benefits of tokenization for secure and efficient processing. This digital representation corresponds to the "book position" of the entity, a digital counterpart to traditional financial records.

In some arrangements, if a third party, not a customer of the bank, desires to submit a proof request, the third-party's request, instead of being linked to a unique customer cryptographic output, could relate to public components of the entity's financial data, such as the bank's solvency, overall assets, reserves, or liabilities, for instance. The third-party might be an auditor, regulator, or potential investor seeking to verify the financial robustness of the entity. For such cases, the one or more processing circuits receive the proof request from the third-party's computing system. This request may target the overall economic data of the bank, represented by the root cryptographic output stored in the data structure (e.g., the Merkle tree) that was previously broadcasted to the distributed ledger. As a response to the proof request, the one or more processing circuits would provide a cryptographic proof dataset, which can be used to confirm the requested aspects of the bank's financial state.

In some arrangements, if a third party, not a customer of the bank, desires to submit a proof request in connection with an account, a hash of the account (e.g., leaf 360) and the hash of neighboring branches and leaves (e.g., leaves 361, 362, and 363) are provided to the third party computing system to perform a calculation of the hash root (e.g., 380). In response to verifying the hash root, the computing system of the institution managing the account can perform an on-chain movement of an asset of the account during a defined timeframe (e.g., a period of time, before a deadline) provided by the third party computing system to the computing system of the institution to prove on-chain that the computing system of the institution owns and controls the assets of the account previously verified. Perform an on-chain movement of an asset of the account includes changing an amount of the asset or liability (e.g., Input 3), changing an account number (e.g., Input 2), changing a name associated with the account (e.g., Input 1), and so on. The hash root (e.g., 380) is re-calculated and broadcasted in response. A modified hash of the account (e.g., a modified leaf 360) and the hash of neighboring branches and leaves (e.g., leaves 361, 362, and 363) are provided again to the third party computing system to perform a re-calculation of the hash root (e.g., 380). If the obtained hash root is the same as the one broadcaster, possession is confirmed.

In some arrangements, the cryptographic proof dataset that is provided to a third party in response to a proof request can include a selected set of cryptographic outputs that can help the third party validate the aspect of the bank's financial state they're interested in. This doesn't mean they receive an exhaustive or explicit list of the bank's assets or liabilities, but rather an aggregated, obfuscated form of this information, such as the root cryptographic output of the Merkle tree representing the bank's overall posture. Specifically, the cryptographic proof dataset will contain a set of branch cryptographic outputs (e.g., intermediary nodes in the Merkle tree) necessary for the third party to validate the state of the Merkle tree root (representing the bank's overall financial or economic posture), without revealing any customer-specific data. The branch cryptographic outputs included in the proof dataset allow the third party to perform a process, such as a Merkle proof or tree traversal. Starting with the cryptographic output related to the entity's overall posture (the root of the Merkle tree), the processing circuits can move step by step through the tree by applying the cryptographic function to the branch cryptographic outputs included in the proof dataset. If the computation is consistent, the third party can verify that the bank's claimed financial data is indeed accurate, all without needing access to any obfuscated customer data.

At block 440, the one or more processing circuits can generate a cryptographic proof dataset for the customer's cryptographic output, wherein the cryptographic proof dataset comprises at least one of the plurality of cryptographic outputs stored in the data structure. Thus, the cryptographic proof dataset ascertains weather a distinct account or identifier of a customer of the entity is embodied in a unique cryptographic output tied to the processing circuits (e.g., blockchain ledger). The proof dataset is generated in response to the customer's proof request received at block 430. This proof dataset acts as a verifiable response to the customer's request for information about their account or the entity's financial data. In some arrangements, the cryptographic proof dataset includes at least one of the plurality of cryptographic outputs stored in the data structure (e.g., the Merkle tree). This means that the dataset will contain one or more cryptographic outputs that directly relate to the customer's unique cryptographic output. The inclusion of these outputs in the proof dataset allows the customer to verify their account information or the entity's financial data without revealing the specifics of the obfuscated data. In some arrangements, when generating the cryptographic proof dataset, the processing circuits must navigate the data structure, locate the correct cryptographic outputs, and then bundle these outputs into the dataset in a way that allows for efficient and effective verification.

In method 400, when a customer wants to verify their particular assets, they start by submitting a proof request, as mentioned in block 430. This proof request can be associated with their unique cryptographic output, an obfuscated representation of their financial data (e.g., posture) or account status within the financial entity. Upon receiving this request at block 440, the processing circuits generate a cryptographic proof dataset for the customer's unique cryptographic output. For example, with a Merkle tree, the proof creation process involves tracing a path from the leaf node representing the customer's cryptographic output up to the root node of the tree.

Referring to a traversal of a Merkle tree in more detail. First, the processing circuits can locate or identify the customer's leaf node. The processing circuits begins by locating the leaf node in the Merkle tree that corresponds to the customer's unique cryptographic output. Each leaf node in the Merkle tree represents at least one cryptographic output, and the one corresponding to the customer is their obfuscated account data. Next, the processing circuits, after locating the correct leaf node, can execute a traversal of the Merkle tree upwards towards the root. As part of the Merkle tree's structure, each node is the result of a cryptographic function applied to its children nodes. Therefore, to move up the tree from the customer's leaf node, the processing circuits retrieves the sibling node at each level and applies the same cryptographic function used to generate the tree initially. This process continues until the system reaches the root node. During or after the traversal, the processing circuits can generate a proof dataset consisting of the cryptographic outputs from the sibling nodes along the path from the customer's leaf node to the root. This dataset is the proof that the customer can use to perform a proof (e.g., solvency, assets, liabilities, etc.). As shown, the proofs allow customers or third-parties to receive cryptographic proof datasets instantly, giving them real-time confirmation of their financial data or the entity's overall financial data. Additionally, even though the data is accessible in real-time, it's also secure and confidential.

When a customer or a third party submits a proof of solvency request, the one or more processing circuits will respond by generating and providing a cryptographic proof dataset. This dataset can be a toolset that allows the customer to perform their own verification on the obfuscated data structure, such as a Merkle tree, which represents the financial posture of the entity. Firstly, it's important to understand that the customer's cryptographic key is unique and closely linked to their individual financial data within the system. When the customer's key is used in conjunction with the provided cryptographic proof dataset, they can traverse the Merkle tree (or another data structure) in a manner that validates the bank's reported solvency status. Starting from the leaf node associated with their specific key, the customer can follow the path upwards towards the root node, verifying each successive parent node's cryptographic output along the way. These parent nodes are formed by combining and obfuscating the cryptographic outputs of their corresponding child nodes, so if the computed hash from the customer's traversal matches the parent node's stored hash, it's a strong indication that the data has not been tampered with. Eventually, the customer will reach the root node. If the root node's hash matches the cryptographic output computed through the customer's traversal, it confirms the veracity of the data structure and by extension, the reported solvency of the bank. Importantly, this process can be completed without revealing the specific data of other customers, as the obfuscation of individual financial details is preserved throughout the verification.

When a customer or a third party submits a proof of assets request, the one or more processing circuits will respond by generating and providing a cryptographic proof dataset. A proof of assets request enables a customer or a third party to independently verify that their assets are accurately included in the bank's overall financial posture. Similar to the proof of solvency request, the proof of assets also utilizes the unique cryptographic key of the requester and a provided cryptographic proof dataset. Upon receiving a proof of assets request, the system generates a cryptographic proof dataset. This dataset allows the requester to navigate the data structure to verify that their assets are correctly accounted for. To perform the proof of assets, the requester starts at the leaf node associated with their specific cryptographic key in the data structure. This leaf node represents an obfuscated version of the customer's own assets. The customer then initiates a traversal, verifying the hash values of parent nodes along the path from the leaf node to the root, much like in the proof of solvency. Each step of this traversal verifies that the customer's assets are included in the aggregation of assets that form the parent nodes. Since these parent nodes are successively combined to form the root node, which represents the total assets of the bank, a successful traversal verifies the inclusion of the customer's assets in the bank's total assets.

Just as a customer or third-party can perform a proof of assets, they can also perform a proof of liabilities. This action enables a customer or a third party to independently verify that their liabilities are accurately included in the bank's overall financial data. The proof of liabilities utilizes the unique cryptographic key of the requester and a provided cryptographic proof dataset, in the same manner as the proof of solvency and proof of assets. The one or more processing circuits can generate a cryptographic proof dataset in response to a proof of liabilities request, allowing the requester to navigate the data structure to verify their liabilities are correctly accounted for. The requester can initiate the proof of liabilities process by starting at the leaf node associated with their specific cryptographic key in the Merkle tree. This leaf node represents an obfuscated version of the customer's liabilities. The traversal begins, verifying the hash values of parent nodes along the path from the leaf node to the root. Each traversal step confirms that the customer's liabilities are included in the aggregation of liabilities that make up the parent nodes. These parent nodes are successively combined to form the root node, which represents the total liabilities of the bank. A successful traversal verifies the inclusion of the customer's liabilities in the bank's total liabilities. Like the other proof processes, the proof of liabilities allows the customer to independently verify their liability inclusion without disclosing the specifics of their or any other customers' financial information. It maintains privacy and ensures data security, while providing real-time verification of liabilities.

In various arrangements, if the proof of solvency, proof of assets, or proof of liabilities fails, the customer or third-party would be made aware through a discrepancy detected during the traversal of the Merkle tree. Specifically, the cryptographic proof dataset generated for the requested proof would not accurately lead from the leaf node associated with their specific cryptographic key up to the root node of the tree. Any mismatch in hash values during the verification of parent nodes along the path to the root indicates a failure in the proof process. This failure means that the customer or third-party's associated solvency, assets, or liabilities are not correctly reflected in the bank's overall financial data as they should be. Accordingly, these proofs allow for immediate detection of discrepancies, signaling a need for further investigation to rectify the mismatch, and thus ensuring the trustworthiness of the system.

While method 400 has been described with a focus on utilizing Merkle trees for cryptographic proofs, it is important to note that Merkle trees are not the sole data structure that can be employed for this purpose. The system's versatility enables it to adapt and leverage various other types of data structures. For example, a hash chain could be utilized as an alternative. In a hash chain, each hash input includes the hash result of the previous input, creating a sequential 'chain' of hashed data. In such a system, the proofs would involve following this chain, rather than traversing a tree. In another example, a Directed Acyclic Graph (DAG) could serve as an alternative data structure. Within this structure, cryptographic outputs could be associated with individual nodes, and the connections between the nodes would represent the obfuscation process. Performing a proof in such a system would involve navigating through the nodes along the directed paths, offering another means of providing cryptographic proof datasets for proofs of solvency, assets, or liabilities, thus extending the versatility of the system beyond just Merkle trees. This adaptability to various data structures underscores the flexible and scalable nature of the improved systems and methods, designed to provide real-time, obfuscated yet verifiable financial data (e.g., such as posture data) using cryptographic functions and distributed ledger technology.

At block 450, the one or more processing circuits can provide the cryptographic proof dataset to the customer computing system. In some arrangements, this proof dataset is unique and pertinent only to the respective customer, offering them an insight into their account status and solvency without compromising the details of any other account holder. Upon successful receipt of the cryptographic proof dataset, the customer's computing system can proceed to decode and analyze the data. Notably, the decoding process does not reveal any specific financial figures or confidential account details. Instead, it allows the customer to perform a proof, without revealing any specifics. This obfuscated proof enables the customers to verify the entity's claims about their financial posture independently and in real-time.

It should be understood that method 400 is data and posture agnostic. This refers to the ability of the processing circuits to handle various economic data, be it solvency, assets, reserves, or liabilities, without any specific processing circuits or system adjustments or alterations. This adaptability not only widens the applicability of the system across different types of financial entities or organization but also promotes a higher level of efficiency in data handling and processing. In various arrangements, the entity posture is composed of a multitude of sub-postures. Each sub-posture can be a representation of an individual customer's unique economic position or posture. While the entity posture provides an overarching view of the financial health of the entity, the sub-postures provide additional details, offering a granular view of each customer's unique economic position. Importantly, even though these sub-postures are intrinsically tied to the overall entity posture, they are handled and stored in a obfuscated manner, preserving customer privacy and account confidentiality.

In some arrangements, entity's posture is publicly available. That is, these data points, representing essential financial parameters such as solvency, assets, reserves, or liabilities, are unobfuscated and publicly accessible. In contrast, the individual sub-postures, which include sensitive and specific customer data, are obfuscated (i.e., protected). Despite being part of the broader data structure and directly contributing to the entity posture, these sub-postures maintain the confidentiality of the individual customers' data. As such, a customer can confidently verify their specific account posture in the knowledge that their specific information remains confidential and is not at risk of being revealed during this process.

Additionally, financial postures, by their nature, are dynamic and subject to change due to various operations such as buying, selling, or transferring of assets and liabilities. These alterations to an entity's posture, or indeed, to an individual customer's posture (sub-posture), can necessitate updates to the data structure generated by the processing circuits. For example, in response to any indication of an update to a posture, the processing circuits can generate an updated data structure, which includes the existing plurality of cryptographic outputs and the new ones resulting from the changes in posture. Here, the updated posture can be encoded, obfuscated, and inserted into the existing data structure via a new cryptographic output. This output then becomes part of the data structure that represents the entity's financial situation, which now reflects the updated posture. In various arrangements, each customer's unique economic posture is taken into account during the update. For instance, if a customer initiates a buy, sell, or transfer action, this exchange is captured, obfuscated, and encoded into a new cryptographic output. This output replaces the existing one linked to the customer in the data structure, thereby updating the customer's sub-posture and, in turn, the overall entity posture. This way, each customer's actions directly contribute to the real-time status of the entity posture. Once the updated data structure is generated, it can be broadcast to the distributed ledger by the processing circuits.

In some arrangements, the at least one posture can represent an aggregate obfuscation of the entity's on-chain solvencies, on-chain assets, on-chain reserves, and/or on-chain liabilities. This posture is associated with a multitude of accounts belonging to a multitude of customers of the entity. By aggregating and obfuscating this data, the processing circuits ensures that the financial health and stability of the entity can be understood without exposing individual customer account details. The posture, therefore, offers a cryptographically secure, privacy-preserving snapshot of the entity's overall financial position on the blockchain, while maintaining the confidentiality of individual account information for each customer.

In some arrangements, the entity posture, which encompasses financial details such as solvency parameters, asset parameters, reserves parameters, or liabilities parameters, can be made publicly available. The solvency parameters, for example, may include measures such as debt-to-equity ratio, liquidity ratios, or other indicators that provide insight into the entity's ability to meet its long-term obligations. Asset parameters can detail the nature and value of the entity's holdings, including cash, investments, property, and other tangible or intangible assets. The reserves parameters may include the financial cushions the entity maintains, such as capital reserves or provisions for contingencies. Finally, the liabilities parameters can offer insights into the entity's debts and obligations, which could range from short-term payables to long-term loans or bonds. Together, these parameters form a picture of the entity's financial posture, contributing to the transparency and trustworthiness of its financial operations.

In some arrangements, upon receiving an indication of an update to the entity's financial posture, the processing circuits can generate an updated data structure including the multitude of cryptographic outputs that represent the entity's revised financial status or position. This process is reflective of the dynamic nature of financial operations, such as buying, selling, or transferring assets, which cause changes in the entity's financial posture. Once the updated data structure is generated, it is then broadcasted to the distributed ledger.

Figure 5A:
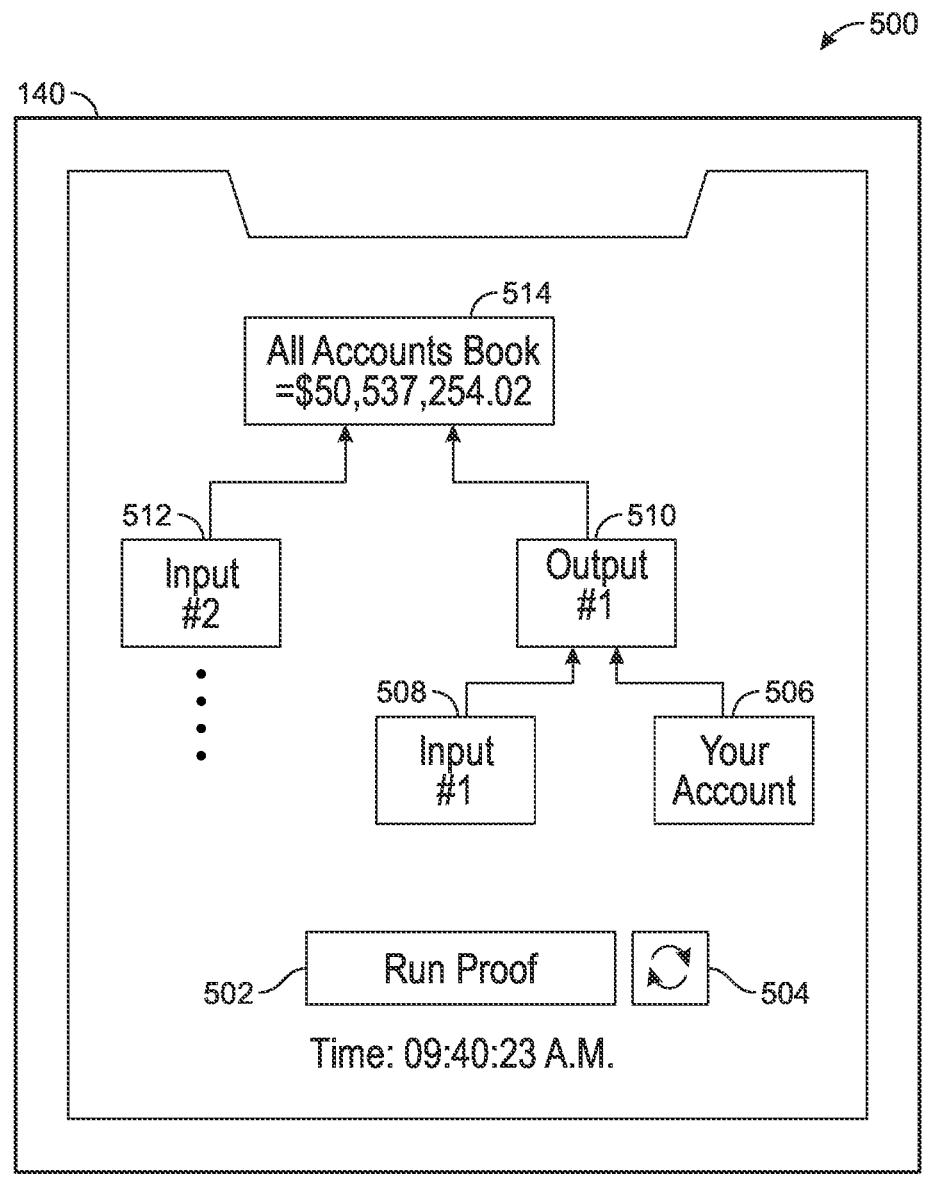
FIGS. 5A-5B are example graphical user interfaces, according to some arrangements.
Figure 5B:
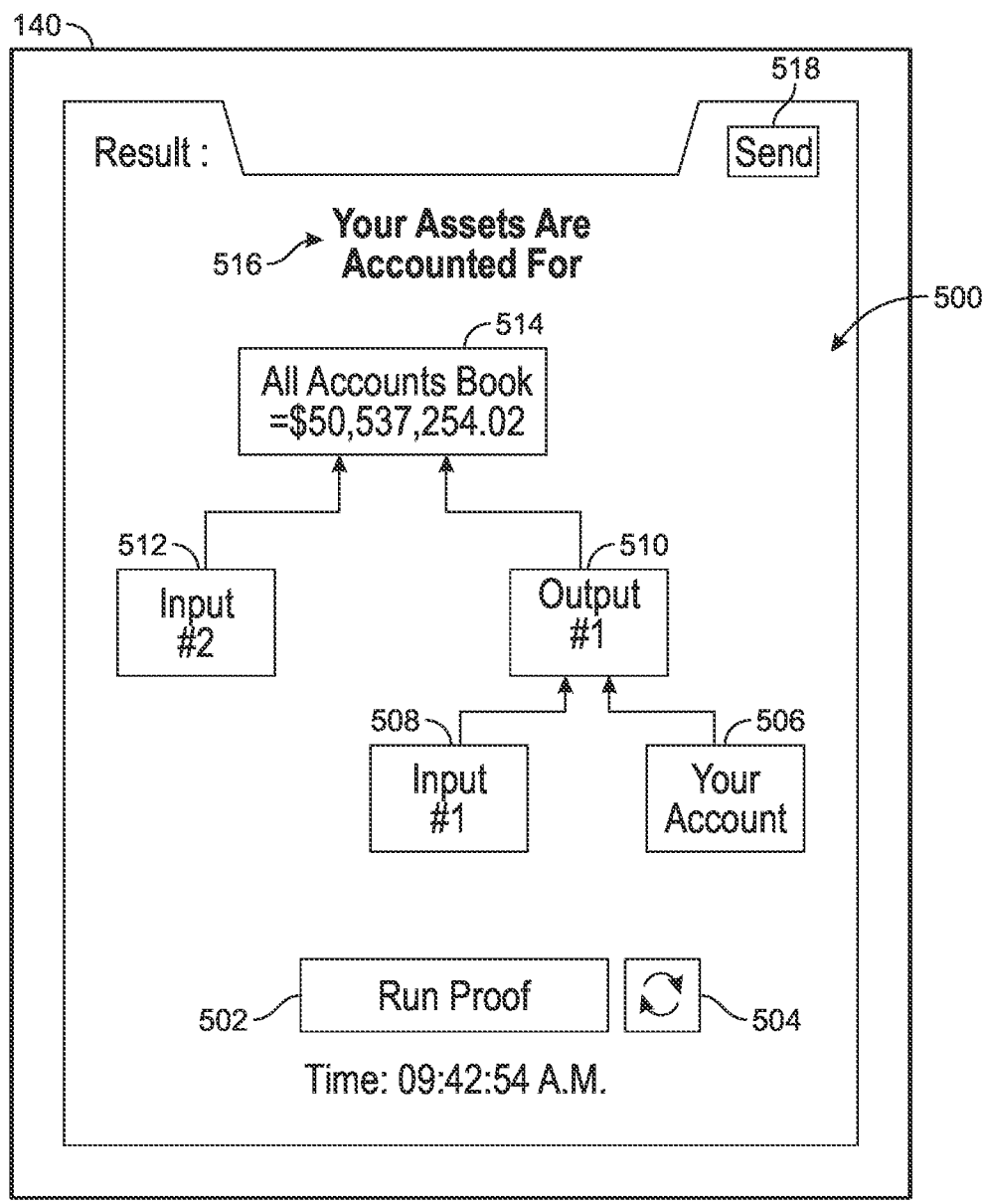

Referring now to FIGS. 5A and 5B, a graphical user interface (GUI) 500 is shown, according to some arrangements. The GUI 500 can be presented on user device 140 and can be configured to present obfuscated information of the data structure to allow the user (e.g., customer, third-party) to perform a proof. For example, the customer may be presented with their leaf 506 and another leaf 508, both used as input to generate an output 510. The output 510 (a branch) can be combined with another input 512 to generate an output 514, which is the root. As shown, only the branches or leaves that need to be depicted will be presented. Additionally, it should be understood while the graphical user interface 500 presents Your Account 506, Input #1 508, Output #1 510, Input #2, and Root 514 in human-readable language, that is simply for ease of understood and instead they would typically represent cryptographic outputs that can be used to perform a proof.

This GUI 500, rendered on user device 140, displays obfuscated information from the data structure, thereby enabling the user, whether a customer or a third-party, to execute a proof. To offer an example, consider a scenario where a customer is presented with two items of data: their unique cryptographic leaf 506, and an additional leaf 508. These two leaves, which represent obfuscated versions of their account information, serve as input for generating a subsequent output 510. This output 510, forming a branch of the data structure, is then integrated with another input 512, culminating in the generation of output 514, the root of the data structure. As shown, the GUI 500 selectively presents data (i.e., only the cryptographic proof dataset). Rather providing the user with the complete data structure, the GUI 500 reveals only the branches or leaves relevant to the user's proof request (e.g., provided in a cryptographic proof dataset). Moreover, it should be understood that while GUI 500 presents components like "Your Account" 506, "Input #1" 508, "Output #1" 510, "Input #2", and "Root" 514 in human-readable language for ease of comprehension, these components are typically the obfuscated, cryptographic representations of user data in the actual system.

In some arrangements, the GUI 500, we can presents a variety of interactive buttons and elements designed to facilitate user actions, particularly in relation to proof operations. For instance, there's the "run proof" interactive button 502 which a user can select to execute a proof operation. This interactive feature renders the proof operation a user-friendly, easily-accessible process. In various arrangements, GUI 500 is dynamic such that it can reflect updated data structures at the click of the "refresh" interactive button 504. This feature ensures users always interact with the most current data structures, enhancing the accuracy and relevance of their proof operations. In addition to this dynamic functionality, the GUI 500 also features a time display, offering temporal context to user interactions. The operation of the "run proof" interactive button 502 prompts user device 140, either running locally or interfacing with the traceability system 110, to execute the proof. Following this, the GUI 500 is updated to display whether the proof operation was successful. In the provided example, the user was conducting a proof of assets operation. However, it should be understood that the GUI 500 supports a range of proof operations, including but not limited to proofs of solvency, reserves, and liabilities. Furthermore, the GUI 500 can be equipped with a "send" button 518. This feature allows users to share the results of their proof operation, including the data structure traversal path, with other parties or even to themselves for further scrutiny. This capability opens up the possibility for collaborative analysis, enables third-party verification of proof operations, and provides users the means to document and revisit their proof processes at a later time.

While this specification contains many specific implementation details and/or arrangement details, these should not be construed as limitations on the scope of any disclosure or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), math-based currencies (often referred to as cryptocurrencies), and central bank digital currency (often referred to as CBDC). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A system, comprising:
    at least one memory and one or more processors configured to:
        generate a data structure comprising a plurality of cryptographic outputs, wherein each of the plurality of cryptographic outputs obfuscates data of at least one identifier of an entity;
        broadcast the data structure to a distributed ledger;
        receive, from a customer computing system, a proof request associated with a customer's cryptographic output of the plurality of cryptographic outputs of the data structure;
        generate a cryptographic proof dataset for the customer's cryptographic output, wherein the cryptographic proof dataset comprises at least one of the plurality of cryptographic outputs stored in the data structure; and
        provide, to the customer computing system, the cryptographic proof dataset;
        wherein the generation of the data structure and the generation of the cryptographic proof dataset is data agnostic;
        wherein the entity is associated with an entity posture, wherein the entity posture comprises a plurality of sub-postures, and wherein at least one of the plurality of sub-postures represents an economic posture unique to a customer; and
        wherein the entity posture is publicly available and comprises unobfuscated data corresponding to at least one of a solvency parameter, an asset parameter, a reserves parameter, or a liabilities parameter, and wherein each of the plurality of sub-postures is obfuscated data of a plurality of customers of the entity.

2. The system of claim 1, wherein generating the data structure further comprises:
    obfuscating, using a cryptographic function, first data and second data to generate a first cryptographic output;
    obfuscating, using the cryptographic function, the first cryptographic output and third data to generate a second cryptographic output; and
    updating the data structure to comprise the second cryptographic output, wherein the second cryptographic output is one of the plurality of cryptographic outputs.

3. The system of claim 2, wherein prior to obfuscating the first data and the second data, the first data is aggregated with the second data using a first mathematical function, and wherein prior to obfuscating the first cryptographic output and the third data, the first cryptographic output is aggregated with the third data using a second mathematical function.

4. The system of claim 2, wherein the first data and the second data comprises customer account identification information and the third data is a customer account balance associated with the customer account identification information.

5. The system of claim 2, wherein the cryptographic function is a hash function configured to tokenize the data for each of the plurality of cryptographic outputs, and wherein the hash function generates quantum resistant signatures stored as the plurality of cryptographic outputs in the data structure.

6. The system of claim 1, wherein the data structure comprises a Merkle tree comprising a root node and a plurality of branches and a plurality of leaves, wherein each leaf of the plurality of leaves comprises a leaf cryptographic output of the plurality of cryptographic outputs, and wherein the root node comprises a root cryptographic output corresponding to at least one of a proof of solvency, a proof of assets, a proof of reserves, or a proof of liabilities of the entity.

7. The system of claim 6, wherein the data represents an aggregate obfuscation of entity's on-chain solvencies, on-chain assets, on-chain reserves, or on-chain liabilities, and wherein the at least one identifier is associated with a plurality of accounts of the plurality of customers of the entity.

8. The system of claim 6, wherein the Merkle tree is stored in a block on the distributed ledger, and wherein the leaf cryptographic output represents obfuscated customer account information of the customer of the entity, and wherein each branch of the Merkle tree comprises a branch cryptographic output corresponding to an aggregation of at least two leaves of the plurality of leaves using a cryptographic function.

9. The system of claim 1, wherein the customer's cryptographic output is unique to the customer, and wherein the data is a digital position of the entity corresponding to a tokenization of a book position of the entity associated with the customer.

10. The system of claim 1, wherein the at least one memory and the one or more processors is further configured to:
in response to an indication of an update to the data, generate an updated data structure comprising the plurality of cryptographic outputs; and
broadcast the updated data structure to the distributed ledger, wherein the update to the data is associated with an exchange of at least a portion of the data, wherein the exchange is one of a buy, sell, or transfer.

11. A method, comprising:
generating, by one or more processing circuits, a data structure comprising a plurality of cryptographic outputs, wherein each of the plurality of cryptographic outputs obfuscates data of at least one identifier of an entity;
broadcasting, by the one or more processing circuits, the data structure to a distributed ledger;
receiving, by the one or more processing circuits from a customer computing system, a proof request associated with a customer's cryptographic output of the plurality of cryptographic outputs of the data structure;
generating, by the one or more processing circuits, a cryptographic proof dataset for the customer's cryptographic output, wherein the cryptographic proof dataset comprises at least one of the plurality of cryptographic outputs stored in the data structure; and
providing, by the one or more processing circuits, to the customer computing system, the cryptographic proof dataset;
wherein the generation of the data structure and the generation of the cryptographic proof dataset is data agnostic;
wherein the entity is associated with an entity posture, wherein the entity posture comprises a plurality of sub-postures, and wherein at least one of the plurality of sub-postures represents an economic posture unique to a customer; and
wherein the entity posture is publicly available and comprises unobfuscated data corresponding to at least one of a solvency parameter, an asset parameter, a reserves parameter, or a liabilities parameter, and wherein each of the plurality of sub-postures is obfuscated data of a plurality of customers of the entity.

12. The method of claim 11, wherein generating the data structure further comprises:
obfuscating, by the one or more processing circuits using a cryptographic function, first data and second data to generate a first cryptographic output;
obfuscating, by the one or more processing circuits using the cryptographic function, the first cryptographic output and third data to generate a second cryptographic output; and
updating, by the one or more processing circuits, the data structure to comprise the second cryptographic output, wherein the second cryptographic output is one of the plurality of cryptographic outputs.

13. The method of claim 12, wherein prior to obfuscating the first data and the second data, the first data is aggregated with the second data using a first mathematical function, and wherein prior to obfuscating the first cryptographic output and the third data, the first cryptographic output is aggregated with the third data using a second mathematical function, and wherein the first data and the second data comprises customer account identification information and the third data is a customer account balance associated with the customer account identification information.

14. The method of claim 12, wherein the data structure comprises a Merkle tree comprising a root node and a plurality of branches and a plurality of leaves, wherein each leaf of the plurality of leaves comprises a leaf cryptographic output of the plurality of cryptographic outputs, and wherein the root node comprises a root cryptographic output corresponding to at least one of a proof of solvency, a proof of assets, a proof of reserves, or a proof of liabilities of the entity.

15. A system, comprising:
memory and one or more processors configured to:
generate a data structure comprising a plurality of cryptographic outputs, wherein each of the plurality of cryptographic outputs obfuscates data of at least one identifier of an entity;
broadcast the data structure to a distributed ledger;
receive, from a third-party computing system, a proof request;
generate a cryptographic proof dataset, wherein the cryptographic proof dataset comprises at least one of the plurality of cryptographic outputs stored in the data structure; and
provide, to the third-party computing system, the cryptographic proof dataset;
wherein the generation of the data structure and the generation of the cryptographic proof dataset is data agnostic;
wherein the entity is associated with an entity posture, wherein the entity posture comprises a plurality of sub-postures, and wherein at least one of the plurality of sub-postures represents an economic posture unique to a customer; and
wherein the entity posture is publicly available and comprises unobfuscated data corresponding to at least one of a solvency parameter, an asset parameter, a reserves parameter, or a liabilities parameter, and wherein each of the plurality of sub-postures is obfuscated data of a plurality of customers of the entity.

16. The system of claim 15, wherein generating the data structure further comprises:
obfuscating, using a cryptographic function, first data and second data to generate a first cryptographic output;
obfuscating, using the cryptographic function, the first cryptographic output and third data to generate a second cryptographic output; and
updating the data structure to comprise the second cryptographic output, wherein the second cryptographic output is one of the plurality of cryptographic outputs.

17. The system of claim 16, wherein prior to obfuscating the first data and the second data, the first data is aggregated with the second data using a first mathematical function, and wherein prior to obfuscating the first cryptographic output and the third data, the first cryptographic output is aggregated with the third data using a second mathematical function, and wherein the first data and the second data comprises customer account identification information and the third data is a customer account balance associated with the customer account identification information.

18. The system of claim 15, wherein the data structure is a Merkle tree comprising a root node and a plurality of branches and a plurality of leaves, wherein each leaf of the plurality of leaves comprise a leaf cryptographic output of the plurality of cryptographic outputs, and wherein the root node comprises a root cryptographic output corresponding to at least one of a proof of solvency, a proof of assets, a proof of reserves, or a proof of liabilities of the entity.

* * * * *